United States Patent
Dimitrov et al.

(10) Patent No.: US 10,713,756 B2
(45) Date of Patent: Jul. 14, 2020

(54) HW-ASSISTED UPSCALING AND MULTI-SAMPLING USING A HIGH RESOLUTION DEPTH BUFFER

(71) Applicant: Nvidia Corporation, Santa Clara, CA (US)

(72) Inventors: Rouslan Dimitrov, Santa Clara, CA (US); Lei Yang, Santa Clara, CA (US); Chris Amsinck, Santa Clara, CA (US); Walter Donovan, Santa Clara, CA (US); Eric Lum, Santa Clara, CA (US); Rui Bastos, Santa Clara, CA (US)

(73) Assignee: Nvidia Corporation, Santa Clara, CA (US)

( * ) Notice: Subject to any disclaimer, the term of this patent is extended or adjusted under 35 U.S.C. 154(b) by 220 days.

(21) Appl. No.: 15/967,688

(22) Filed: May 1, 2018

(65) Prior Publication Data

US 2019/0340730 A1 Nov. 7, 2019

(51) Int. Cl.
| | |
|---|---|
| G06K 9/32 | (2006.01) |
| G06T 3/40 | (2006.01) |
| G06T 5/00 | (2006.01) |
| G06T 5/20 | (2006.01) |

(52) U.S. Cl.
CPC ............ G06T 3/4092 (2013.01); G06T 5/002 (2013.01); G06T 5/20 (2013.01); *G06T 2200/12* (2013.01); *G06T 2200/16* (2013.01); *G06T 2207/10016* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 6,756,993 B2 | 6/2004 | Popescu et al. | |
| 7,064,771 B1 * | 6/2006 | Jouppi | G09G 5/363 345/506 |
| 7,616,202 B1 * | 11/2009 | Chen | G06T 15/80 345/426 |
| 8,134,637 B2 * | 3/2012 | Rossbach | H04N 5/2355 348/348 |
| 8,276,084 B2 | 9/2012 | Castelli et al. | |

(Continued)

FOREIGN PATENT DOCUMENTS

| | | |
|---|---|---|
| CN | 102265535 A | 11/2011 |
| CN | 103957397 A | 7/2014 |

(Continued)

OTHER PUBLICATIONS

"Client-Side vs. Server-Side Rendering"; http://openmymind.net/2012/5/30/Client-Side-vs-Server-Side-Rendering/; May 30, 2012; pp. 1-5.

(Continued)

*Primary Examiner* — Feng Niu

(57) ABSTRACT

One aspect of the current disclosure provides a method of upscaling an image. The method includes: rendering an image, wherein the rendering includes generating color samples of the image at a first resolution and depth samples of the image at a second resolution, which is higher than the first resolution; and upscaling the image to an upscaled image at a third resolution, which is higher than the first resolution, using the color samples and the depth samples.

26 Claims, 15 Drawing Sheets

(56) References Cited

U.S. PATENT DOCUMENTS

| | | | |
|---|---|---|---|
| 8,325,196 B2 | 12/2012 | Riemens et al. | |
| 8,352,991 B2 | 1/2013 | Cahnbley et al. | |
| 8,403,757 B2 | 3/2013 | Mizrachi | |
| 8,429,699 B2 | 4/2013 | Rodriguez et al. | |
| 8,643,701 B2 * | 2/2014 | Nguyen | G06T 5/003 |
| | | | 348/47 |
| 8,692,902 B2 | 4/2014 | Narayanan et al. | |
| 8,749,561 B1 | 6/2014 | Diercks et al. | |
| 8,773,469 B2 * | 7/2014 | Komorowski | G06T 3/4092 |
| | | | 345/660 |
| 8,823,702 B2 * | 9/2014 | Smithwick | G02B 30/56 |
| | | | 345/419 |
| 8,918,450 B2 | 12/2014 | Ohtsuka et al. | |
| 8,983,177 B2 * | 3/2015 | Tuzel | G06T 3/4053 |
| | | | 382/154 |
| 9,047,681 B2 | 6/2015 | Choi et al. | |
| 9,105,112 B2 * | 8/2015 | Holland | G06F 1/3228 |
| 9,367,920 B2 | 6/2016 | Choi et al. | |
| 9,508,129 B1 | 11/2016 | Wang et al. | |
| 9,547,887 B2 | 1/2017 | Liang et al. | |
| 9,576,340 B2 * | 2/2017 | Pajak | H04N 19/46 |
| 9,613,293 B2 * | 4/2017 | Choi | G06T 5/003 |
| 9,654,765 B2 * | 5/2017 | Nguyen | G06T 5/003 |
| 9,704,270 B1 * | 7/2017 | Main | G06T 9/00 |
| 9,710,957 B2 * | 7/2017 | Berghoff | G06T 17/20 |
| 9,767,596 B2 | 9/2017 | Jung et al. | |
| 9,811,753 B2 | 11/2017 | Venkataraman et al. | |
| 9,865,074 B2 * | 1/2018 | Berghoff | G06T 15/005 |
| 9,959,659 B2 * | 5/2018 | Cho | G06T 15/005 |
| 9,965,865 B1 * | 5/2018 | Agrawal | G06T 7/194 |
| 9,990,727 B2 * | 6/2018 | Yoon | G06K 9/4604 |
| 10,062,181 B1 * | 8/2018 | Longhurst | G06F 30/00 |
| 10,156,937 B2 * | 12/2018 | Tretter | G06F 3/14 |
| 10,366,472 B2 * | 7/2019 | Lelescu | H04N 13/128 |
| 10,368,046 B2 * | 7/2019 | Vandewalle | H04N 13/111 |
| 10,430,957 B2 * | 10/2019 | Yoon | H04N 5/23229 |
| 10,438,396 B2 * | 10/2019 | Berghoff | G06T 15/405 |
| 10,488,500 B2 * | 11/2019 | Zhu | G01S 17/86 |
| 10,510,183 B2 * | 12/2019 | Berghoff | G06T 15/04 |
| 10,607,317 B2 * | 3/2020 | Lim | G06T 5/002 |
| 2006/0028686 A1 | 2/2006 | Bergman et al. | |
| 2006/0055695 A1 * | 3/2006 | Abdalla | G06T 15/005 |
| | | | 345/426 |
| 2006/0225061 A1 * | 10/2006 | Ludwig | G06T 15/005 |
| | | | 717/161 |
| 2009/0089852 A1 | 4/2009 | Randolph et al. | |
| 2011/0179106 A1 | 7/2011 | Hulse et al. | |
| 2011/0194727 A1 | 8/2011 | Guo et al. | |
| 2013/0093779 A1 | 4/2013 | Lyons et al. | |
| 2013/0194255 A1 * | 8/2013 | Lee | H04N 13/128 |
| | | | 345/419 |
| 2014/0292803 A1 | 10/2014 | Cook | |
| 2015/0071533 A1 * | 3/2015 | Krishnan | G06T 5/40 |
| | | | 382/167 |
| 2015/0201198 A1 | 7/2015 | Marlatt et al. | |
| 2015/0287239 A1 * | 10/2015 | Berghoff | G06T 11/40 |
| | | | 345/422 |
| 2016/0012567 A1 | 1/2016 | Siddiqui et al. | |
| 2016/0104457 A1 | 4/2016 | Wu et al. | |
| 2016/0163023 A1 * | 6/2016 | Wey | G06T 3/40 |
| | | | 345/428 |
| 2017/0078721 A1 | 3/2017 | Brockmann et al. | |
| 2017/0094262 A1 * | 3/2017 | Peterson | G06T 19/006 |
| 2017/0148139 A1 * | 5/2017 | Cutu | H04N 9/646 |
| 2017/0262582 A1 | 9/2017 | Wasnik et al. | |
| 2017/0365100 A1 * | 12/2017 | Walton | G06K 9/00624 |
| 2018/0007400 A1 | 1/2018 | Chen et al. | |
| 2018/0137603 A1 * | 5/2018 | Hsiao | G06T 3/4053 |
| 2018/0295400 A1 | 10/2018 | Thomas et al. | |
| 2018/0336714 A1 | 11/2018 | Stoyles et al. | |
| 2019/0141339 A1 | 5/2019 | Madajczak et al. | |

FOREIGN PATENT DOCUMENTS

| | | |
|---|---|---|
| JP | 5253118 B2 | 7/2013 |
| WO | 2017143550 A1 | 8/2017 |

OTHER PUBLICATIONS

Taha, et al.; "Error Correction for Video Streaming to Enhance MPEG Performance Quality"; 2015 11th International Conference on Innovations in Information Technology (IIT); IEEE; 2015; pp. 201-206.

"Increase Virtual Machine Density up to 4X 1,2"; 2013; Intel; 1 pg.

Zhao, et al.; "Simultaneously Color-Depth Super-Resolution with Conditional Generative Adversarial Network"; arXiv: 1708.09105v2 [cs.SV]; Nov. 8, 2017; pp. 1-11.

Mesquita, et al.; "Simultaneously Estimation of Super-Resolution Images and Depth Maps from Low Resolution Sensors"; Computer Science Department Universidade Federal de Minas Gerais Belo Horizonte, MG, Brazil; Aug. 26-29, 2015; 8 pgs.

* cited by examiner

HW-ASSISTED UPSCALING AND MULTI-SAMPLING USING A HIGH RESOLUTION DEPTH BUFFER

CROSS REFERENCE TO RELATED APPLICATION

The present application is also related to U.S. patent application Ser. No. 15/967,645, filed May 1, 2018, entitled "ADAPTIVE UPSCALING OF CLOUD RENDERED GRAPHICS" naming Rouslan Dimitrov, et. al, as inventors, and incorporated herein by reference in its entirety.

TECHNICAL FIELD

This application is directed, in general, to a video upscaling and rendering process and, more specifically, to managing resources of a server system through the video rendering process.

BACKGROUND

In a cloud based application service, images can be rendered as part of an executing application, encoded into a video stream, and then delivered to a client computing device for display to a user. Certain applications can be more resource intensive than others. For example, a fast moving game application can require significantly more graphical processing to render images than a CAD application. On a physical server system or sets of servers, the amount of resources, for video rendering is limited, i.e., there is a maximum level of computational resources available to be used by applications.

As additional applications are started and actively running on a server system, such as when additional application virtual machines (VMs) are created, the available resources of the server system are allocated to each of the VMs. Due to the physical limitation of the maximum computational resources available, there will be a maximum number of VMs that can actively be run on the server system before there is a degradation in response and execution speed of the application VM. Currently, the industry method of resolving this issue is to add additional servers systems to support additional application VMs, thereby adding cost to the environment for the hardware, the physical space required, and the system engineers to maintain the additional server systems.

To display an image with the optimal display quality, especially on a liquid crystal (LCD), organic light-emitting diode (OLED), or other kind of flat panel display, one has to render the image at a resolution that matches the native resolution of the display. As the native resolutions continue to increase, from the current ~8 million pixels (4K) to ~32 million pixels (8K) or even more, rendering an image at these high resolutions can be very expensive in terms of resource and time. Also, when an image is rendered remotely and has to be transmitted to the display, the higher resolutions place an increasing burden on the communications link. It is noted that these displays can span a wide range of physical dimensions, from the few inches of a smartphone screen, to many feet for a large flat panel.

SUMMARY

One aspect of the current disclosure provides a method of upscaling an image. The method includes: rendering an image, wherein the rendering includes generating color samples of the image at a first resolution and depth samples of the image at a second resolution, which is higher than the first resolution; and upscaling the image to an upscaled image at a third resolution, which is higher than the first resolution, using the color samples and the depth samples.

Another aspect of the current disclosure provides a system for upscaling an image. The system includes: a processor includes: a rendering engine configured to render an image by generating color samples of the image at a first resolution and depth samples of the image at a second resolution, which is higher than the first resolution; and an upscaling engine configured to upscale the image to an upscaled image at a third resolution, which is higher than the first resolution, using the color samples and the depth samples; and a memory coupled to the processor and includes a color buffer storing the color samples and a depth buffer storing the depth samples.

Yet another aspect of the current disclosure provides a computer program product. The computer program product, when executed by one or more processors, causes the one or more processors to: render an image by generating color samples of the image at a first resolution and depth samples of the image at a second resolution, which is higher than the first resolution; and upscale the image to an upscaled image at the second resolution using the color samples and the depth samples.

BRIEF DESCRIPTION

Reference is now made to the following descriptions taken in conjunction with the accompanying drawings, in which.

Figure 5A:
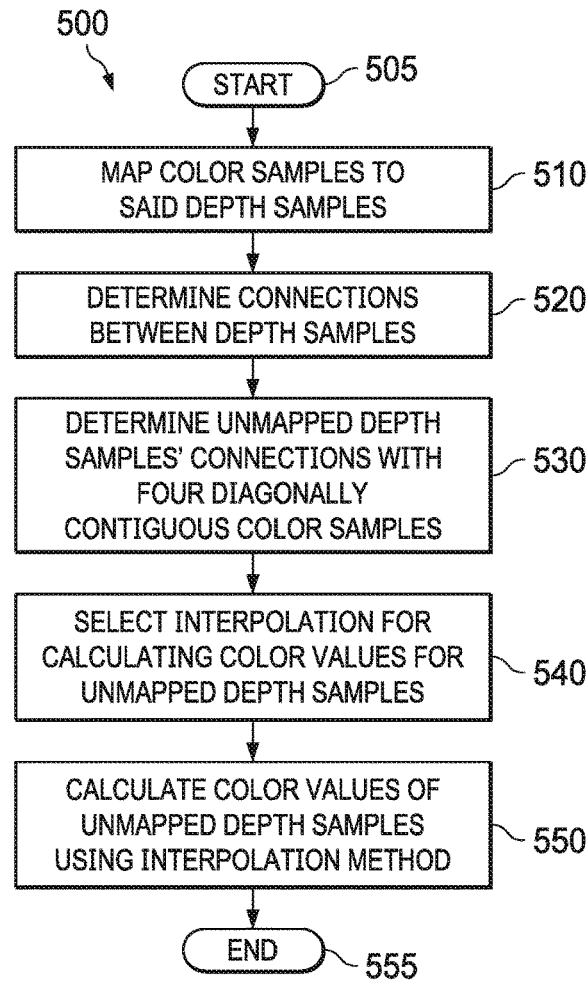
FIG. 5A illustrates a flow diagram of an example method for upscaling an image carried out a according to the principles of current disclosure.
Figure 5B:
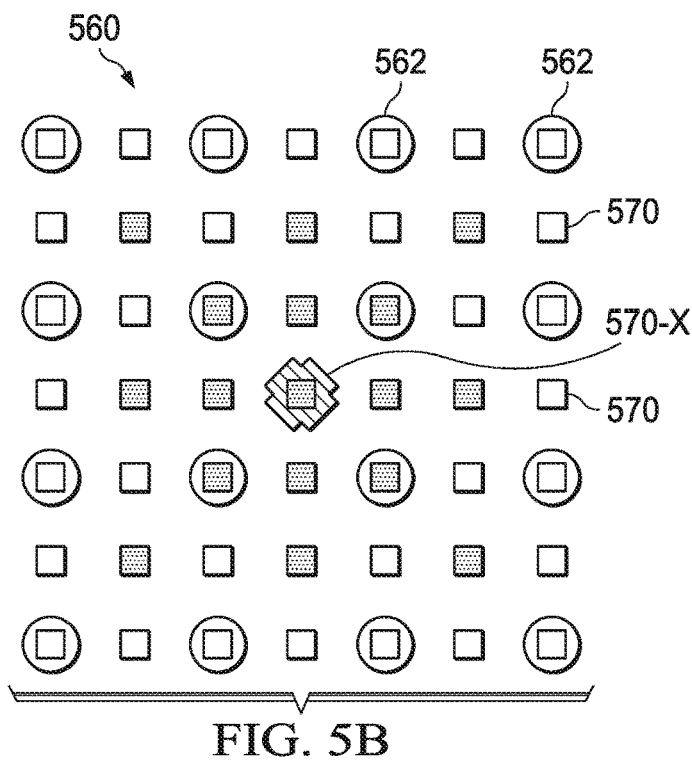
FIG. 5B illustrates an example of a grid with 4:1 mapping between color and depth samples of an image.
Figure 5C:
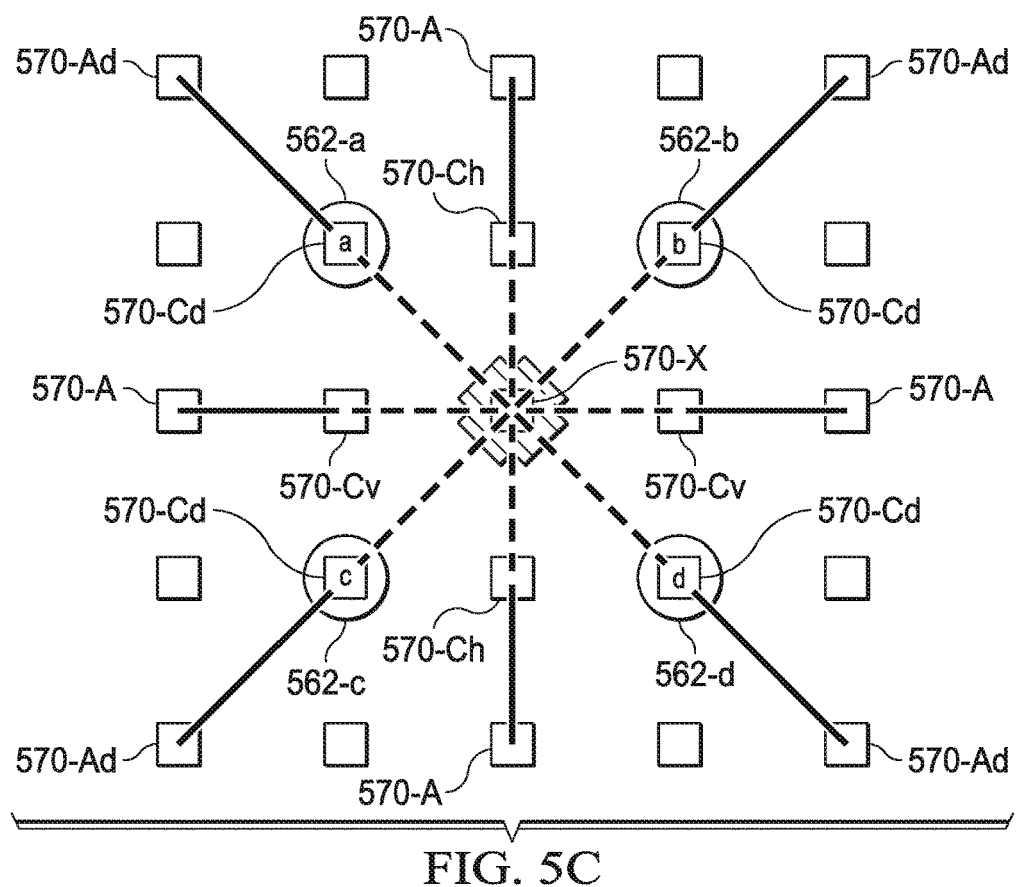
FIG. 5C illustrates another view of the grid of FIG. 5B with slopes between depth samples.
Figure 5D:
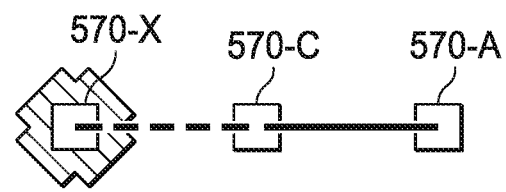
FIG. 5D illustrates an exemplary pair of with the slopes in the grid of FIGS. 5B and 5C.
Figure 5E:
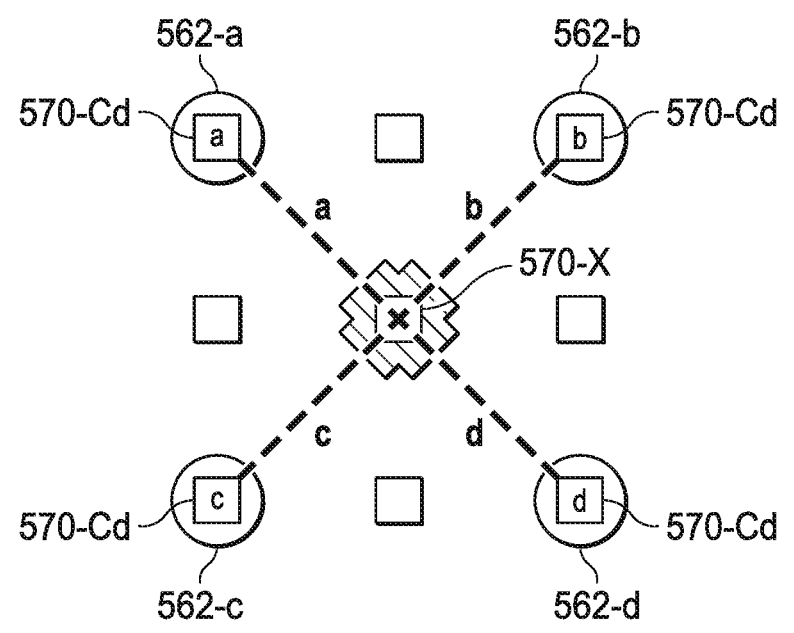
FIG. 5E illustrates yet another view of the grid of FIGS. 5B and 5C.
Figure 5F:
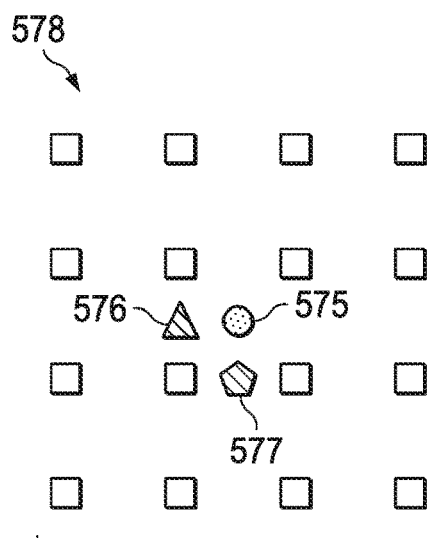
FIG. 5F illustrates an example of a grid with interior depth samples.
Figure 5G:
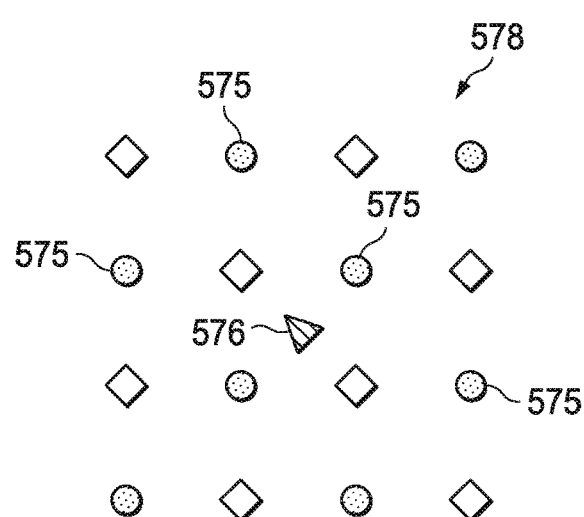
FIG. 5G illustrates an example of a grid that has been logically rotated.
Figure 5H:
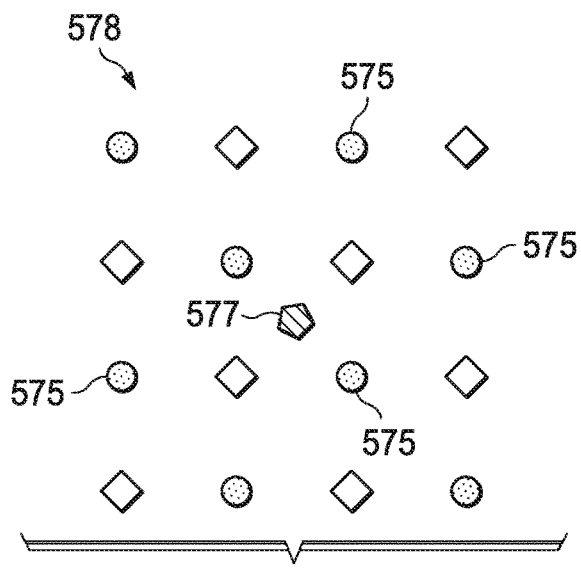
FIG. 5H illustrates another example of a grid that has been logically rotated.
Figure 5I:
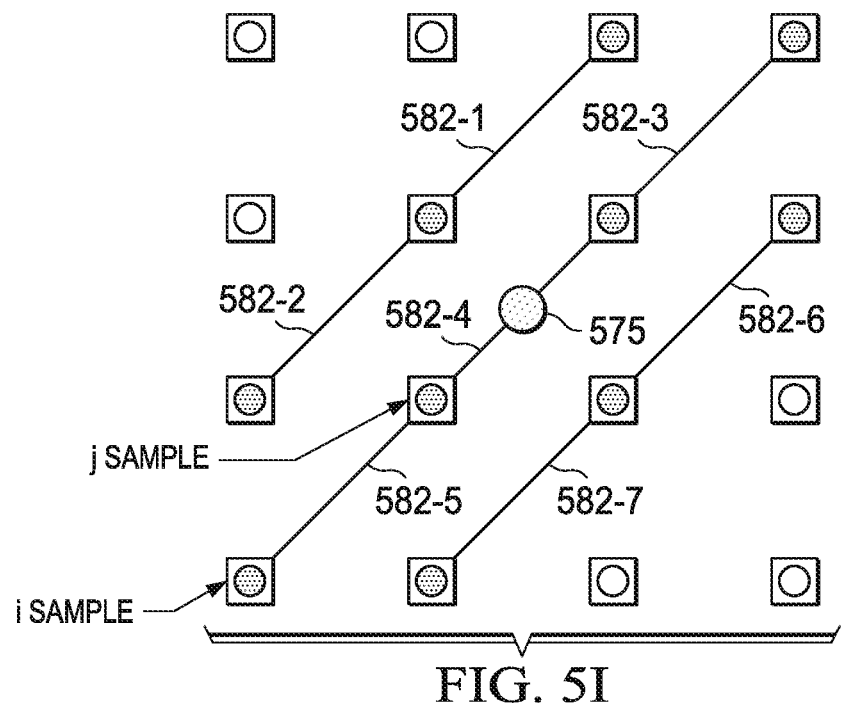
Figure 5J:
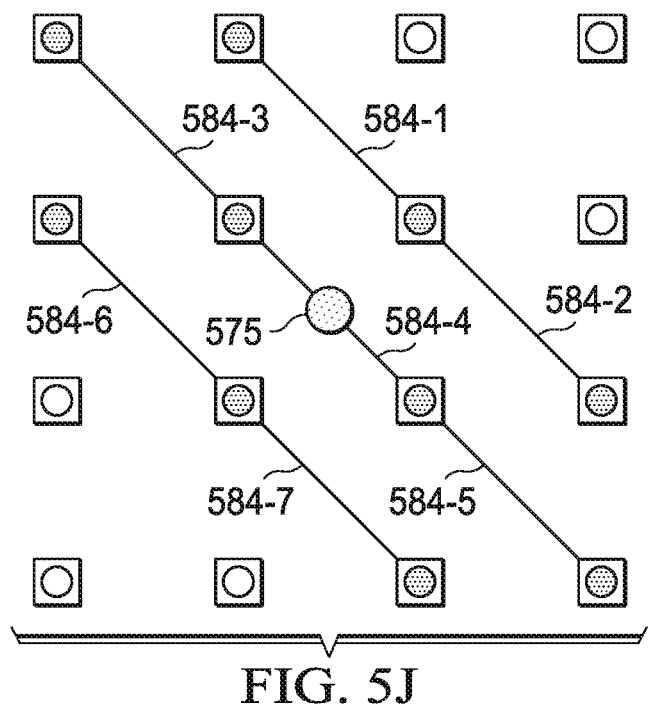
Figure 5K:
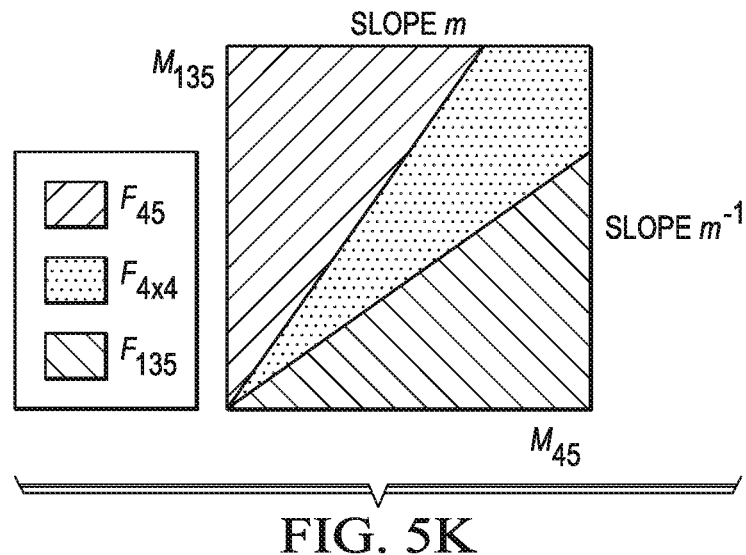
Figure 5L:
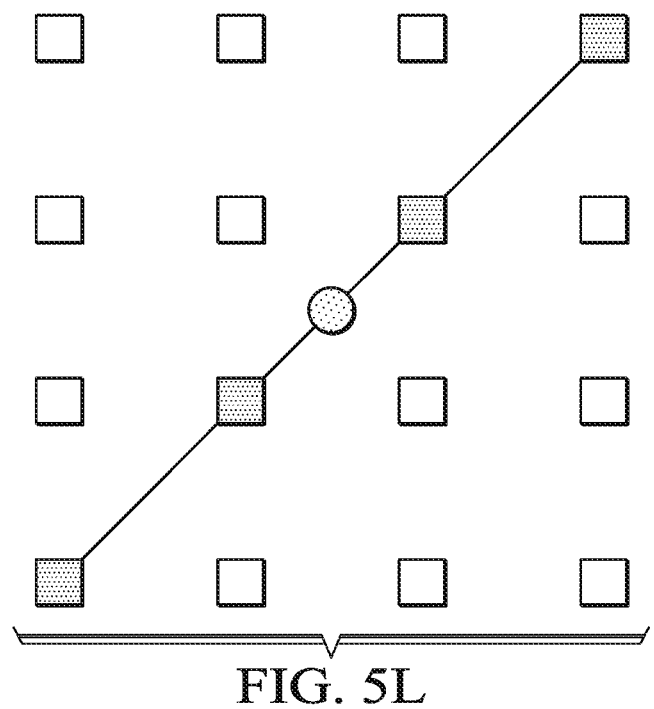
Figure 5M:
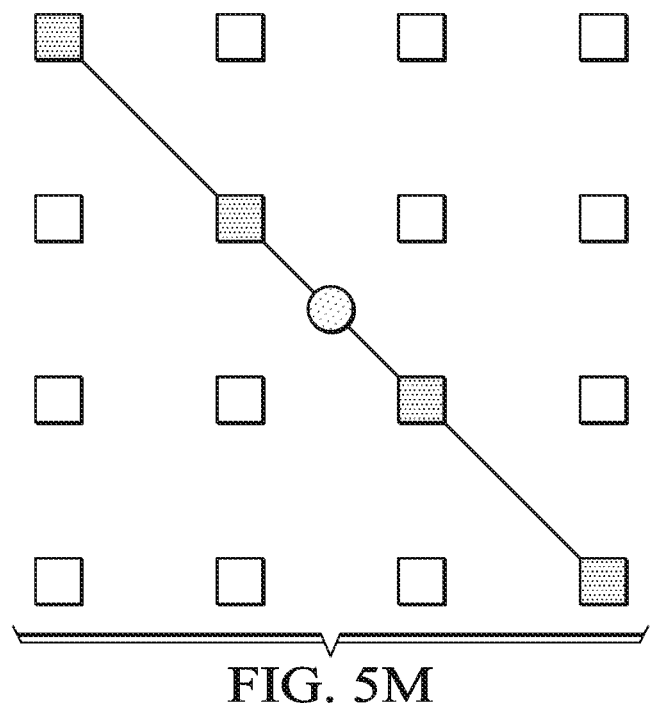
Figure 5N:
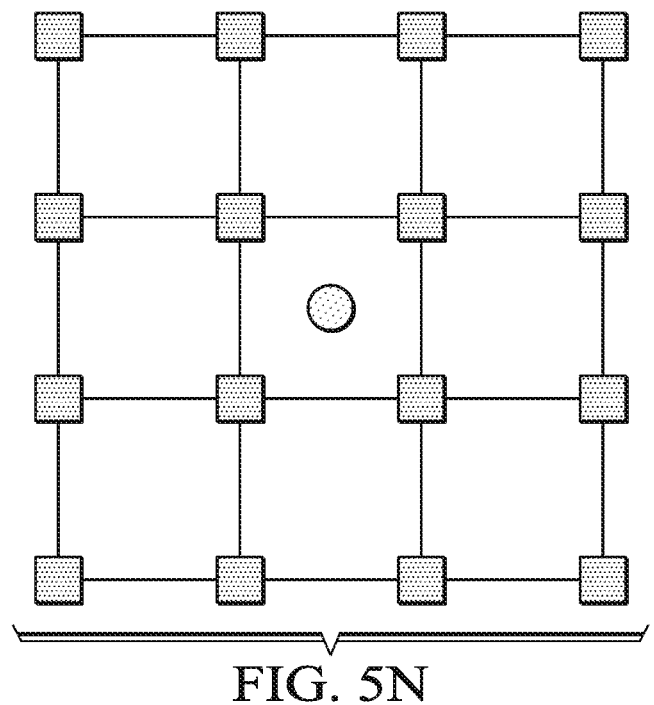
Figure 5O:
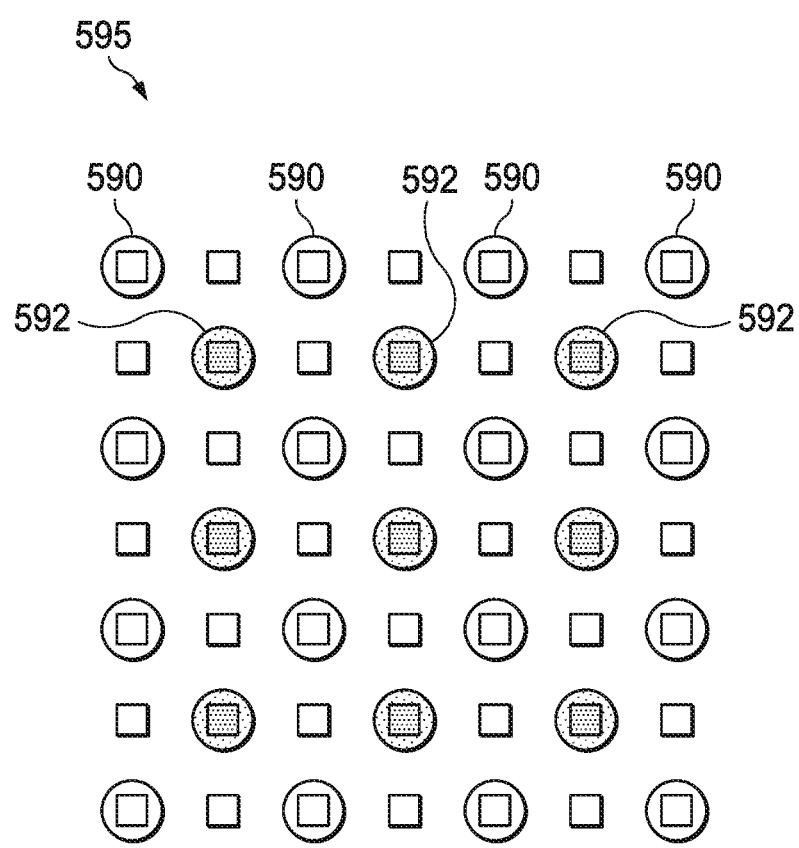
Figure 6:
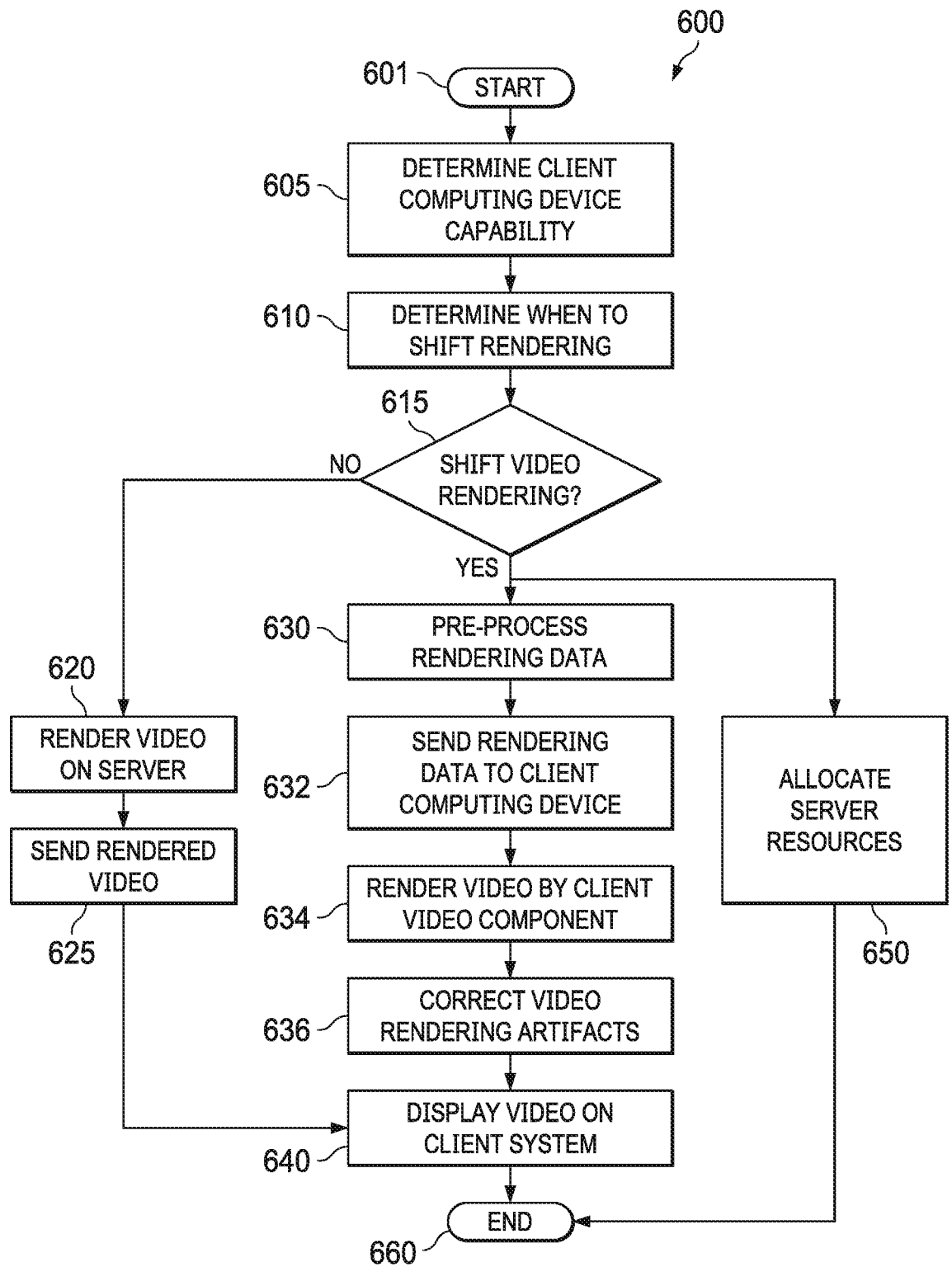
Figure 7:
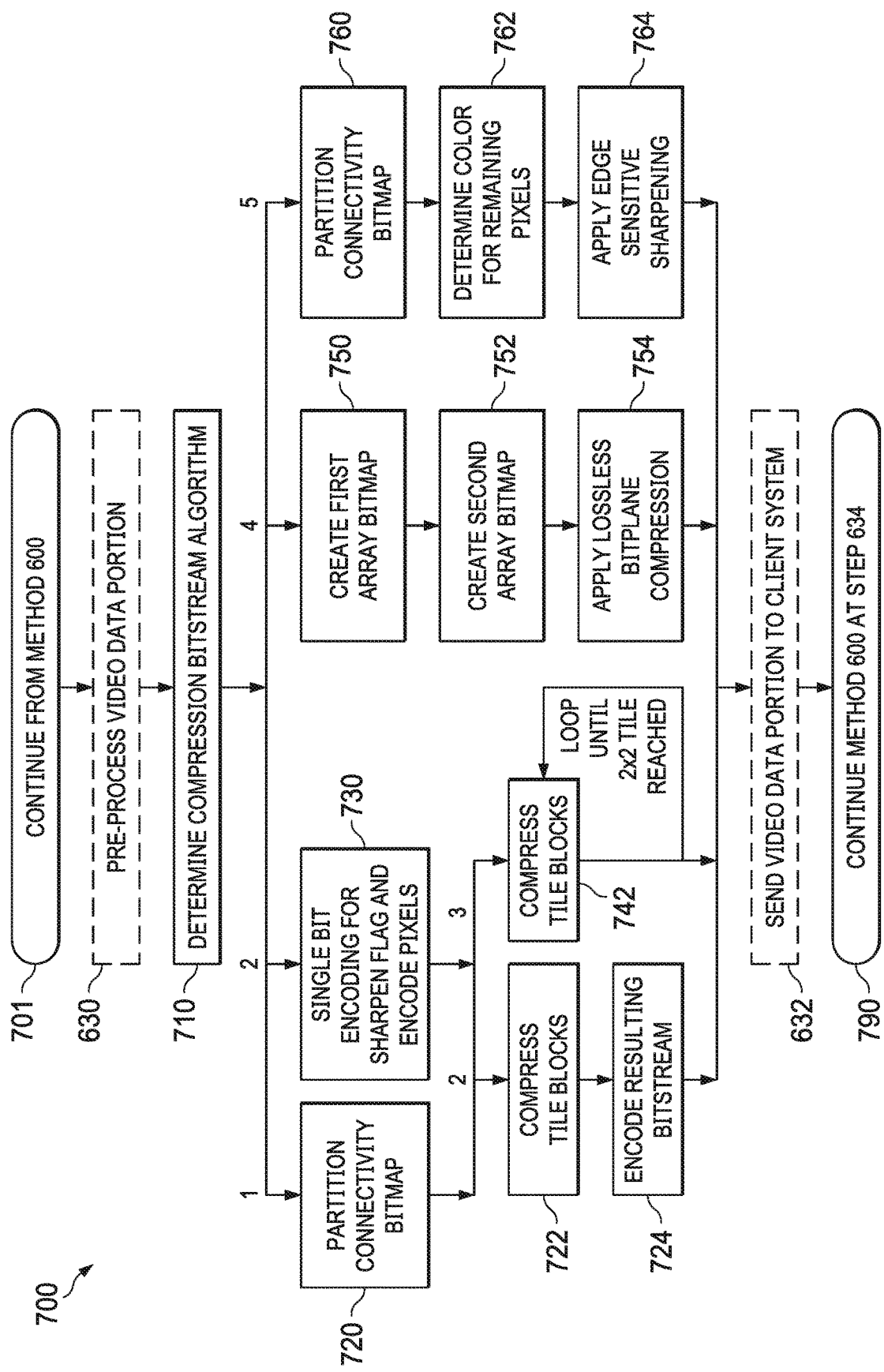
Figure 8:
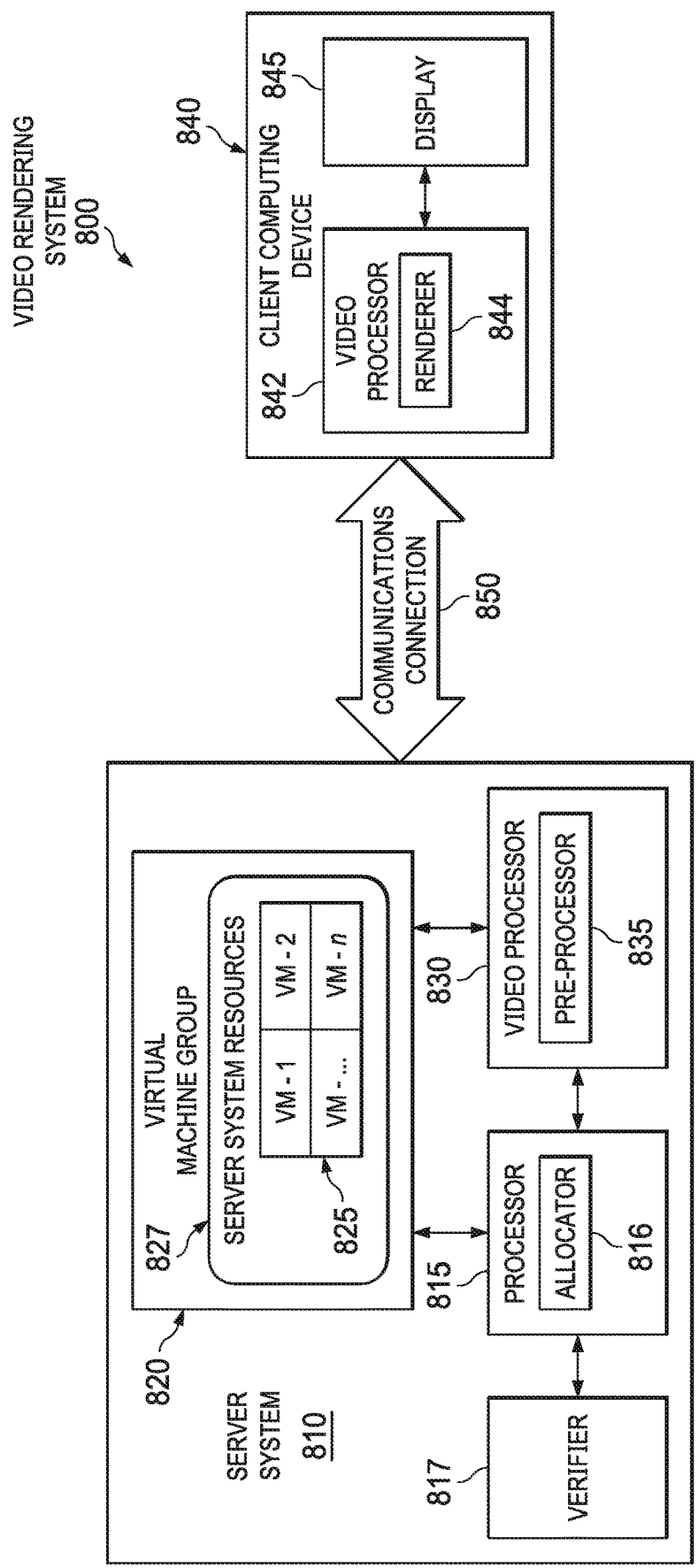
Figure 9:
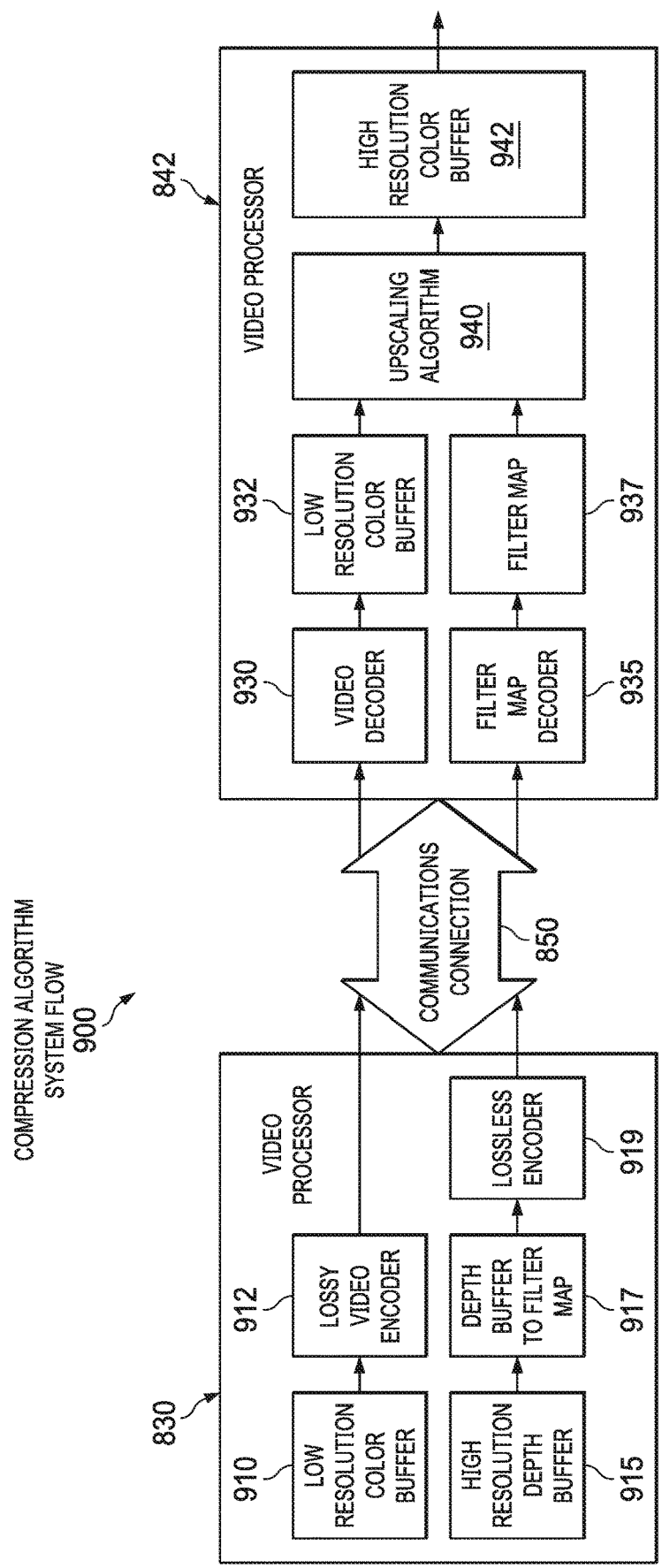
Figure 10:
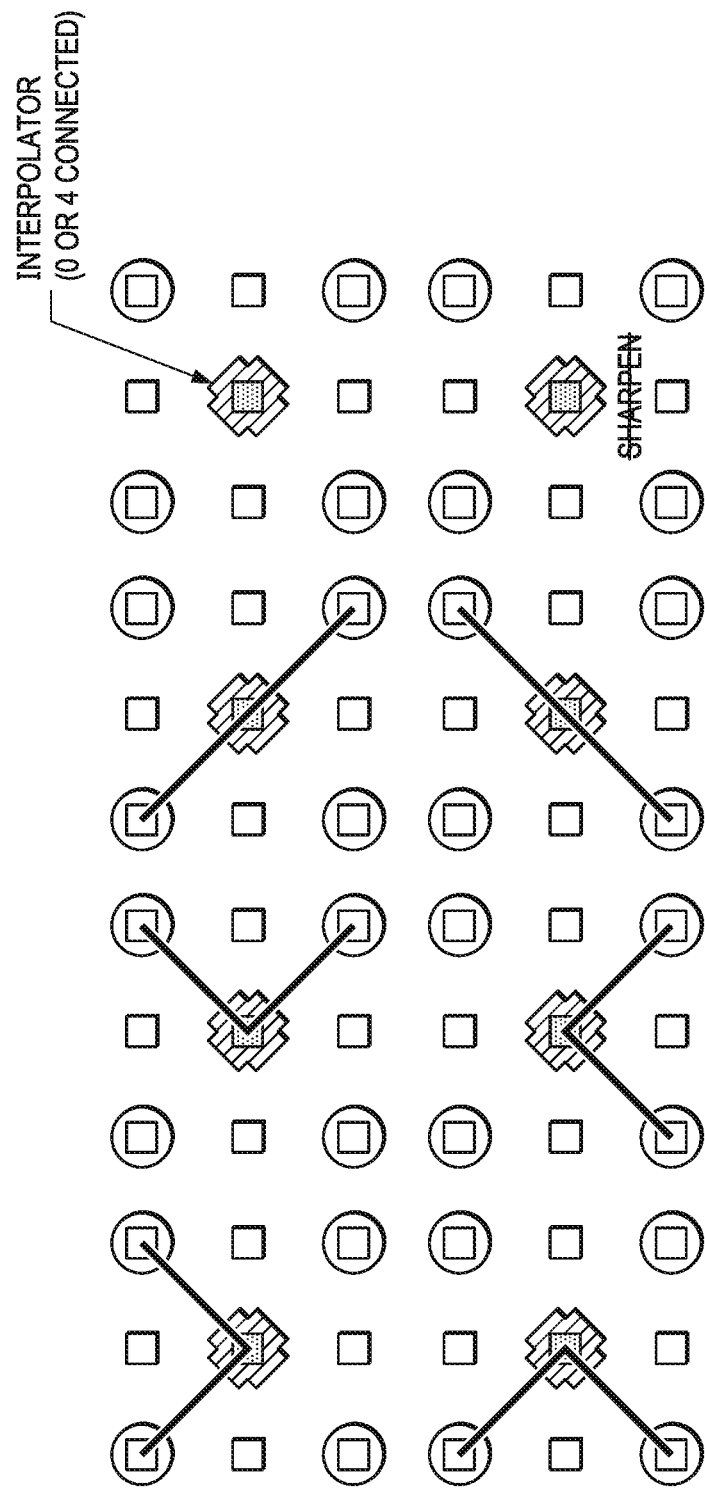

FIG. 5I another view of the grid of FIG. 5F with seven 45° pairs of the mapped color samples;

FIG. 5J illustrates another view of the grid of FIG. 5F with seven 135° pairs of the mapped color samples;

FIG. 5K illustrates an exemplary graph showing dominating directions;

FIG. 5L illustrates another view of the grid of FIG. 5F with a dominating direction of 45°;

FIG. 5M illustrates another view of the grid of FIG. 5F with a domination direction of 135°;

FIG. 5N illustrates another view of the grid of FIG. 5F with no dominating direction; and FIG. 5O illustrates a grid with 2:1 mapping between color and depth samples of an image;

FIG. 6 illustrates a flow diagram of an example method for managing server system resources with respect to rendering images for a video;

FIG. 7 illustrates a flow diagram of an example method for the usage of various compression bit stream algorithms;

FIG. 8 illustrates a block diagram of an example video rendering system capable of delivering a video to a client computing device;

FIG. 9 illustrates a block diagram of an example compression algorithm system flow; and FIG. 10 illustrates different connection cases and the additional information of sharpening when determined on the server that can be used for a filter map.

DETAILED DESCRIPTION

Rendering can be a resource intensive process that uses multiple passes to convert data into a format capable of being displayed on a display device. The rendering process can take into account various embodiments, variations, and scene parameters, such as determining if one object blocks another and to account for lighting and shading of a scene, to compute the color values for the pixels that will be displayed in each frame. The rendering process can be initially executed on a server system or set of server systems (server systems), such as a cloud-based renderer or a data center environment.

Real-time rendering can be used to render images or frames that are then encoded to form a video that can be delivered to client computing devices for display to one or more users. The video utilizes bandwidth and the amount of data in the video directly drives the time it takes to complete the transmission of the video to the client computing device.

Reducing the amount of computational and other resources associated with server systems that are needed to render images can be beneficial to the industry. Methods to shift some or all of the rendering to lower cost systems, i.e. adaptive rendering, such as client computing devices, allows a greater number of virtual machines (VMs) to exist on the server systems. This can increase the VM density, i.e., the number of VMs present in a single physical host which can be run normally without the VMs being starved for a particular resource. Rendering color pixels at a lower resolution and then employing upscaling at the server system, such as discussed above with respect to FIG. 2 to FIG. 5, can also be used to reduce computational and other resource requirements at server systems.

As additional VMs are created on a server, such as when additional client computing devices connect to the environment, the available resources are reduced. When a certain number of VMs are actively running on the physical servers, it is possible that all available resources are being utilized. This number of VMs can vary due to several factors, for example, the hardware being used for the physical server, and the resources required for each of the running VMs. Increasing the number of VMs past the determined maximum number of VMs, i.e. oversubscription, can have the effect that computational resources need to be shared, thereby causing slower response times for processing requests and unpredictable instantaneous resource availability. For example, a video delivered at 60.0 frames per second (FPS) can drop to 30.0 FPS due to the restricted availability of the computational resources, such as central processing units (CPUs) and graphical processing units (GPUs).

To increase efficiency on the server system, video rendering processes can be divided so that on the server system VM, rendering can be performed at a lower resolution and then the upscaling is performed on a client computing device. Rendering data, which can include a low resolution color buffer and connectivity information, can be sent to the client computing device for final rendering (e.g., upscaling) for display on the client computing device. The rendering data can be compressed using an available algorithm and then sent to the client computing device where the client computing device uses the rendering data to generate video for the client display device. Upscaling processes can be executed on the client computing device thereby reducing the resources, i.e. GPUs, processors, memory, and bandwidth, utilized within the server system and application VM. The application that is requesting the video to be displayed can have minimal or no modification in order to take advantage of the adaptive rendering techniques described herein. In the case of implicit upscaling, the process can use heuristics, e.g., an application rendering state and application hints, to detect the screen space depth buffer and instruct a GPU, on behalf of the application, to render a low resolution color buffer and a high resolution screen space depth buffer, i.e. depth-stencil buffer. The reduction in computational resources utilized by the VMs allow additional VMs to be actively running on the server system, thereby increasing the VM density and lowering system operational costs.

The algorithm and heuristics used and the parameters utilized in generating and compressing the rendering data, can be based on and modified by several factors. For example, the available bandwidth between the application VM and the client computing device can determine the level of lossy compression that may be necessary to maintain a minimum target FPS. The application VM can also request information from the client computing device regarding the capabilities of the client video component, such as built-in optimization protocols, memory, processing power, and other factors. An additional parameter that can be considered by the application VM is the capability of the client display device. For example, the client display device's resolution capability can affect the amount of rendering data needed to be sent to the client computing device to maintain an adequate visual experience for the user of the client computing device.

The algorithm used in pre-processing rendering data to be sent to a client computing device can utilize different factors. For example, the depth pixel count can vary as to the color pixel count. Ratios of various combinations can be used, with the ratio of four depth pixels for each color pixel being described herein. Various ratios, typically based on a power of two, can be utilized, such as two, eight, or sixteen, depth pixels for each color pixel, or other such combinations. Determining an appropriate depth/color ratio can result in the capability to deliver a desired framerate or video quality, for example, 3,840 pixels across 2,160 lines (2160p or 4K) resolution.

A pixel connectivity map can be obtained from the depth buffer and then compressed to a filter map, which indicates to the client computing device how the color buffer should be filtered. Typically, a pixel connectivity map contains eight bits per depth value, indicating the connectivity in the eight possible directions (shown in FIG. 5C, starting with pixel 570-X and examining the path to the eight pixels 570-C(x)). The filter map takes as input the pixel connectivity map for a two by two (2×2) non-overlapping tile of pixels and compresses the data into fewer bits for each 2×2 tile. The filter map can be generated by determining the number of connected pixels of the target pixel. If there are 0 or 4 pixels connected, then an interpolator is used for the pixel, using a 1×4 or 4×4 filter kernel. If there is 1 pixel connected, then the value of the connected pixel is used as the value of the target pixel. If there are 2 pixels connected, the mean of the 2 connected pixels are used as the value of the target pixel. If there are 3 pixels connected, the mean of the 2 pixels on the long diagonal is used as the value for the target pixel.

A block can be of various sizes, such as 8×8 pixels or 16×16 pixels. Once the filter map and color buffer are determined, they each can be sent to the client computing device as rendering data for rendering and upscaling to appropriate client display resolution. Compression techniques can be applied to the rendering data when sending to the client computing device. See FIG. 7 and its accompanying description for a description of some of the compression bit stream algorithms that can be applied.

The delay between when the frame is being rendered, i.e. a determination of what will be displayed and when a video is rendered for display on a client computing device, can be driven by several factors. These factors can also drive the decision process for determining where the video will be rendered, i.e. on the server systems' video processor or on the client computing device. For example, some of the factors and parameters are: the availability of VM or resources at the server, the bandwidth available between the server and the client computing device, the connectivity data throughput between the server and the client computing device, the client payment tier level, and a minimum target FPS for the video for the application that is executing. Depending on the application being executed, a minimum target FPS can be set at 30.0, 60.0, or another appropriate value. For example, a CAD application video can have a minimum target FPS of 30.0 FPS while a game application can have a minimum target FPS set at 60.0 FPS.

In another embodiment, the user of the client computing device can purchase, through various means, a higher tier level of service, for example, the application system should maintain a higher FPS rather than dropping to a lower FPS under conditions where the application server resources become heavily allocated. In addition, the user can purchase a tier of service that provides for a higher resolution video to be delivered to the client computing device. In this circumstance, the application VM can utilize certain algorithms to provide the rendering data in a state to allow upscaling to the desired resolution. In another embodiment, the client computing device, utilizing applications and tools downloaded from the server system, can provide for video image enhancement, such as removing compression artifacts, spatial and temporal anti-aliasing, and modifying the algorithm parameters.

In this disclosure, a video is a stream of rendered images and includes some or all of a portion, segment, frame, scene, or snippet of video that is displayed. For example, the video can be a rendered video scene for a CAD software application or an active game play scene in a game application. Rendering a video refers to rendering images that are then encoded to form a video stream. A client computing device can be a computing device or system coupled directly to the application system, such as through a wired or wireless network connection, or it can be communicatively coupled such as through a type of internet connection.

Figure 1:
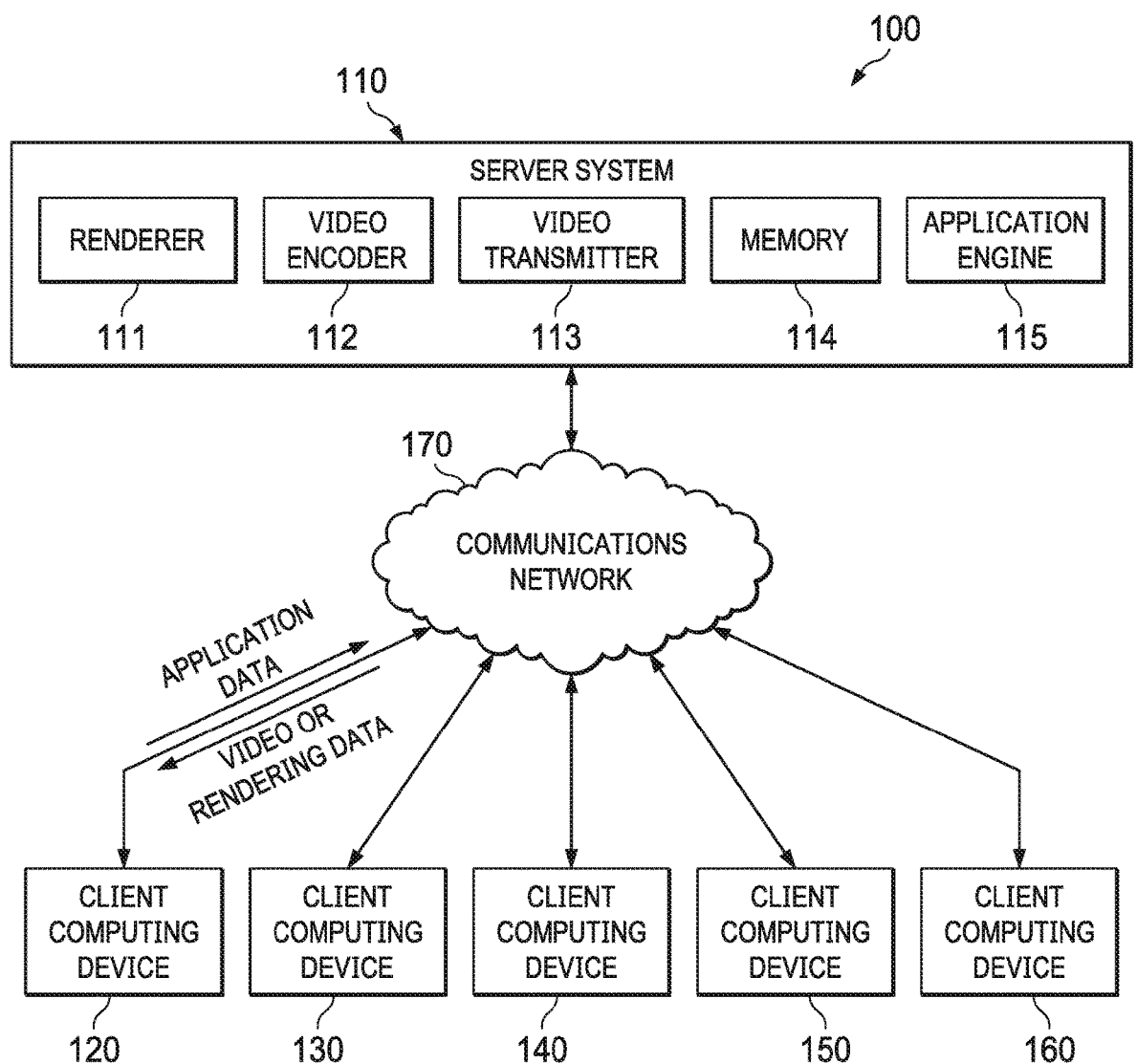
FIG. 1 illustrates a block diagram of an embodiment of a video rendering system constructed according to the principles of the disclosure.

Turning now to the Figures, FIG. 1 illustrates a block diagram of an embodiment of a video rendering system 100 constructed according to the principles of the disclosure. The video rendering system 100 includes a server system 110, client computing devices 120, 130, 140, 150, 160, and a communications network 170. The client computing devices 120, 130, 140, 150, 160, are collectively referred to as client computing devices 120-160, and are communicatively coupled to the server system 110 via the communications network 170. The communications network 170 can be a conventional network, such as the internet, private network, or other type of network, that allows connected client computing devices 120-160 to communicate with the server system 110 and an option to communicate with each other.

The server system 110 is configured to render images and generate video from the rendered images to send to the client computing devices 120-160. The server system 110 can be implemented on a single server or on multiple servers of a cloud computing platform, data center, or other server environment. The server system 110 can include at least one CPU and multiple GPUs. VM's can be created where the CPU and GPU's are allocated to the VMs to provide server-based rendering. In the illustrated embodiment, the server system 110 includes a renderer 111, a video encoder 112, a video transmitter 113, a memory 114, and an application engine 115. The memory 114 can be a conventional memory or memories typically employed with servers. The application engine 115 includes the operating instructions that correspond to the algorithms employed to generate scenes, such as a game engine providing scenes from a video game.

The renderer 111 generates a set of images that are encoded into a video for transmission to the client computing devices 120-160 via the video transmitter 113 and the communications network 170. The renderer 111 can be a cloud-based and server-based renderer. The rendered images correspond to application data received from, for example, the client computing devices 120-160 and the application engine 115. The application data can include scene data.

The renderer 111 can include various computing resources including both CPUs and GPUs. For example, Nvidia Grid™ technology can be employed to provide the renderer and rendering schemes disclosed herein to support rendering of the images, such as disclosed in FIGS. 2 to 5 herein. Nvidia Grid™ is by Nvidia Corporation of Santa Clara, Calif., and provides a graphics virtualization platform that allows the power of Nvidia GPU technology to be used by virtual environments. The renderer 111 can include additional components to those illustrated in FIG. 1 such as typically included in a cloud and server based renderer.

The video encoder 112 encodes the rendered images into a video for transmission. The video encoder 112 can also provide additional functions such as reformatting and image processing. The encoded rendered images are then provided to the video transmitter 113 and sent to the client computing devices 120-160. The video transmitter 113 can be a conventional device that receives encoded frames and transmits them as a video stream. Instead of being included within the server system 110, in some embodiments the video transmitter 113 can be conventionally coupled to the video rendering system 100. In some embodiments, the video transmitter 113 is a video proxy server. As disclosed herein, in some embodiments rendering data can be sent by the video transmitter 113 to use for upscaling at the client computing devices 120-160.

The client computing devices 120-160 can be VR headgear, smartphones, desk top computers, laptops, computing pads, tablets, etc. The client computing devices 120-160 can be thin clients that communicate with the server system 110 and provide sufficient application data thereto for rendering. Each of or at least some of the client computing devices 120-160 can be different types of devices. For example, client computing devices 120-140 can be VR headgears, computing device 150 can be a laptop, and computing device 160 can be an Nvidia SHIELD Tablet.

Figure 2:
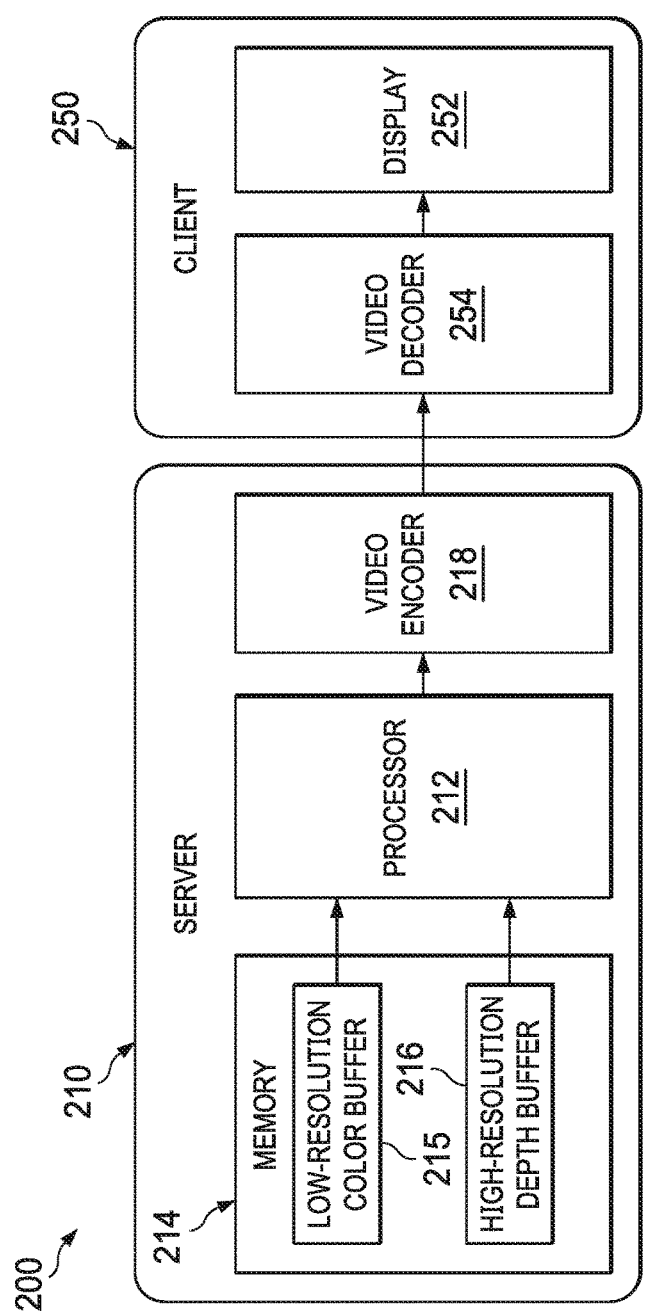
FIG. 2 illustrates a block diagram of an example video/image rendering system that is constructed according to the principles of current disclosure.

FIG. 2 illustrates a block diagram of an embodiment of a video/image rendering system 200 constructed according to the principles of the disclosure. In the illustrated embodiment, the video rendering system 200 includes a server system 210 and a client computing device 250. The server system 210 includes a processor 212, a memory 214, and a video encoder 218, all of which are connected to one another via a conventional means. The processor 212 may include one or more CPUs (not shown) and one or more co-processors, which may take the form of one or more GPUs (not shown). The memory 214 may be any one or more of read-only memory (ROM), volatile random-access memory (RAM) and solid-state or hard drive storage unit. It is understood that although not illustrated, the server system 210 may also include other conventional components of a server.

The client computing device 250 includes a client display 252 and a video decoder 254. The client computing device 250 can be communicatively coupled to server system 210 by various available communication types, such as an internet connection and a type of network connection, such as an Ethernet or wireless connection. Although not illustrated, the client computing device 250 may include other conventional components of a computing device, such as a processor and a memory.

In the illustrated embodiment, the processor 212 renders an image and upscales the rendered image using the color and depth samples thereof. The processor 212 determines connection information from the depth samples of the rendered image and uses the connection information with the color samples of the rendered image to upscale the rendered image into a high-resolution image, such as an image at the second resolution. The processor 212 provides the upscaled image to the video encoder 218 for encoding and transmission to the client computing device 250.

In the illustrated embodiment, the memory 214 includes a low-resolution color buffer 215 that stores the color samples (and values thereof) of the rendered image and a high-resolution depth buffer 216 that stores the depth samples (and values thereof) of the rendered image. The color samples are sampled at a first resolution and the depth samples are sampled at a second resolution that is higher than the first resolution. In one embodiment, the first resolution is 1,920 pixels across 1,080 lines (1080p) and the second resolution is 4K. In another embodiment, the first resolution is 4K and the second resolution is 7,680 pixels across 4,320 lines (4320p or 8K).

In one embodiment, before providing the upscaled image to the video encoder 218, the processor 212 can anti-alias the upscaled image. One method for anti-aliasing can be to apply an algorithm such as fast approximate anti-aliasing (FXAA) or temporal anti-aliasing (TXAA) to the upscaled image. A second method that can be used for anti-aliasing can be to apply a filter to the upscaled image and downscale it back down to the lower resolution. The filter can give the new low resolution image a higher quality than the original image. It is understood that anti-aliasing is an optional process and its applicability is based on the resolutions of the buffers (and samples therein) and the target resolution. The resolution of the anti-aliased image can be the same as the first resolution, which is the resolution of the rendered image's color samples. It is also understood that, based on the target resolution of the anti-aliased image, the resolutions of the buffers and the samples therein may be adjusted.

In the illustrated embodiment, the video encoder 218 encodes the image (and color samples of thereof) received from the processor and transmits the encoded images as a video stream, or video, over the network to the client computing device 250. Although not illustrated, the video encoder 218 can include a network interface that is configured to transmit the encoded images to the video decoder 254. In some embodiments, the server system 210 can include a video transmitter, such as the video transmitter 113 of FIG. 1, which transmits the video of encoded images to the client computing device 250.

In the illustrated embodiment, the video decoder 254 receives and decodes the encoded images from the server system 210. Although not illustrated, the video decoder 254 can include a network interface that is configured to receive the encoded images from the video encoder 218. Once decoded, the images from the server system 210 are provided to the display 252. In the illustrated embodiment, the upscaled images are displayed by the display 252 at a native resolution of the display 252. In one embodiment where the upscaled images are sent without anti-aliasing, the native resolution may be same as the second resolution, i.e. the resolution of the high-resolution depth buffer. In another embodiment where the anti-aliasing is performed on the upscaled images, the native resolution may be the same as the first resolution, i.e. the resolution of the low-resolution depth buffer. It is understood that, based on the intended resolution of the displayed image, the first and second resolutions of the samples may be adjusted.

Figure 3:
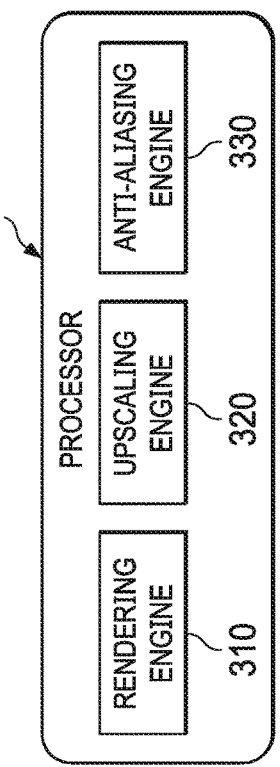
FIG. 3 illustrates a block diagram of an example processor for upscaling an image implemented according to the principles of current disclosure.

FIG. 3 illustrates a block diagram of an example processor 300 for upscaling an image implemented according to the principles of the current disclosure. The processor 300 corresponds to a processor of a server system in a client-server environment such as shown in FIG. 2. In the illustrated embodiment, the processor 300 includes various graphics processing engines including a rendering engine 310, an upscaling engine 320, and an anti-aliasing engine 330. It is understood that each of these graphics processing engines, 310, 320 and 330 may correspond to algorithms represented by a different portion, e.g., a set of instructions, of a computer program product that, when executed by one or more processor, causes the executing processor to perform certain functions.

In the illustrated embodiment, the rendering engine 310 renders an image by generating color samples of the image at a first resolution. The rendering engine 310 also generates depth samples of the image at a second resolution that are higher than the first resolution of the color samples. The color and depth samples are generated from a single rendering pass. Color and depth buffers storing these samples may be located in a memory coupled to the processor 300, for example, a memory such as the memory 214 in FIG. 2.

In the illustrated embodiment, the upscaling engine 320 upscales the rendered image to an upscaled image at a third resolution that is higher than the first resolution. The third resolution may be as high as the second resolution, i.e. the resolution of the depth samples. The upscaling engine 320 interpolates missing color values for the third resolution from the generated color and depth samples.

In the illustrated embodiment, the anti-aliasing (AA) engine 330 anti-aliases the upscaled image. To avoid the cost, e.g., the memory footprint and the bandwidth, of reading/writing the high-resolution upscaled image to an intermediate color buffer, the color samples of the upscaled image are fed directly into the AA engine 330. The upscaling of the upscaling engine 320 and the anti-aliasing of the AA engine 330 may be performed in a single pass.

The AA engine 330 anti-aliases all geometry edges in the upscaled image by resolving the upscaled image back to a lower resolution. The AA engine 330 can divide color samples of the upscaled image into groups, e.g. groups of four adjacent color samples, and take an average of each group. For an easier and simpler implementation of anti-aliasing, the grouping/down sampling ratio may be same as the mapping ratio used in the upscaling. In such a case, the anti-aliased image would have the same resolution as the rendered image, e.g., the first resolution. In an embodiment where the resolution of the upscaled color samples is the same as the target resolution, e.g. display/native resolution, techniques such as fast approximate anti-aliasing (FXAA) or temporal anti-aliasing (TXAA) may be applied to the upscaled color samples. In another embodiment, the AA engine 330 may use a nonlinear filter or a high-order anti-aliasing filter such as Catmull-Rom filter, a Gaussian filter or Mitchell-Netravali filter for a high-quality anti-aliasing. In such an embodiment, each output pixel is computed as a weighted average of a 4×4 neighborhood of samples in the upscaled image.

It is understood that the anti-aliasing of the AA engine 310 is an optional step and may be omitted. For example, in an embodiment where the required resolution, e.g., the native resolution of a display device, is 4K and the upscaled image is already at such a resolution, the anti-aliasing of the AA engine 330 may be omitted to keep the image at the 4K resolution. In an embodiment where the required resolution is less than the upscaled image, the anti-aliasing of the AA engine 330 may be performed to produce a higher quality image having mitigated aliasing artifacts. FIG. 3 is a demonstration of the functionality and features being described herein and each of the components described can be physically combined or separated into one or more processors, of various types, as appropriate.

Figure 4:
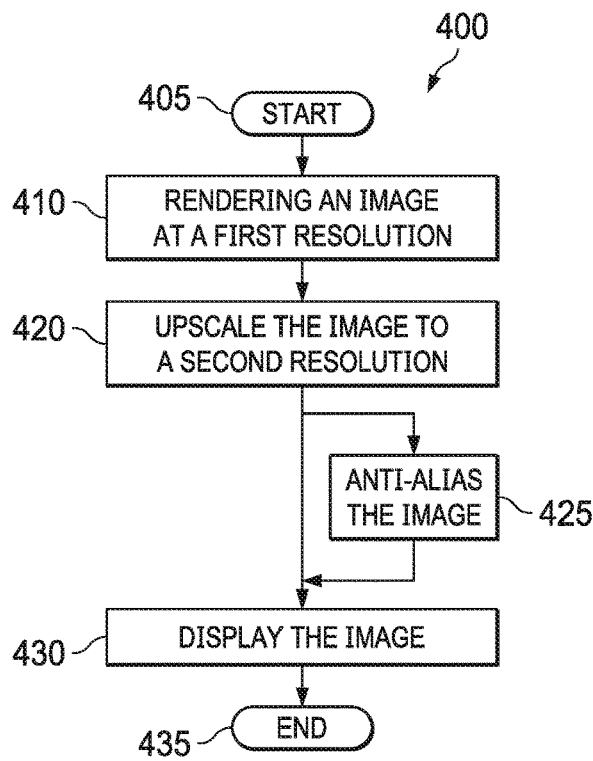
FIG. 4 illustrates a flow diagram of an example method for upscaling an image carried out according to the principles of current disclosure.

FIG. 4 illustrates a flow diagram of an embodiment of a method for upscaling an image. The method 400 may be performed by a server system, such as the server system 200 in FIG. 2. The method 400 begins at step 405.

At step 410, an image is rendered. The step 410 may be performed by a rendering engine executed by a processor such as the rendering engine 310 in FIG. 3. Rendering the image includes generating color and depth samples of the image and storing those samples in respective buffers. In the illustrated embodiment, the color samples of the image, which are generated at a first resolution, are stored in a color buffer such as the low-resolution color buffer 215 in FIG. 2, and the depth samples of the image, which are generated at a second resolution, are stored in a depth buffer of a memory such as the high-resolution buffer 216 in FIG. 2.

In one embodiment, the number of color samples, i.e., the first resolution, is one-fourth the number of depth samples, i.e., the second resolution, and the color samples would be generated once in a single pass with the depth samples. Each generated color sample would correspond to 2×2 depth samples in a grid. This gives a consistent 4:1 (or "4×") ratio between the number of depth and color samples. This mapping is shown in more detail in FIG. 5B.

In another embodiment, the number of color samples, i.e., the first resolution, is one-half the number of depth samples, i.e., the second resolution, giving a 2:1 (or "2×") ratio between the number of depth and color samples. This can be achieved by generating the color samples twice at the 4× ratio of the previous embodiment, but at different offsets. In more detail, for a consistent mapping between the color and depth samples, a first set of the color samples would be generated first for the Original position and a second set of the color samples would be generated for the Diagonal position. The term "Original position" refers to one quadrant in each sample quad, to which each color sample of the first set maps, and the term Diagonal position refers to another quadrant in each sample quad situated diagonally to/from the Original position, to which each color sample of the second set maps. It is understood that the order of generating color samples and the position of the generated color samples may change as long as the two same diagonally positioned quadrants in each sample quad are mapped respectively by the color samples from the first and second sets. This mapping is shown and discussed further with FIG. 5O.

In some embodiments, the position mapping between color samples and depth samples may be dynamically determined at rendering time. In such cases, the color samples are not affixed to a predetermined set of depth samples. Instead, each color sample is considered as shared by all depth sample locations under the (low-resolution) pixel region that it covers during rendering. The shader and hardware are programmed to dynamically select which fragment generating a depth sample can update a color sample. This selection process is necessary when samples generated by a fragment passing depth test only partially cover the depth samples within a color pixel region. There are several selection strategies:

SAMPLEID: the fragment with the pre-specified depth sample ID writes to color;

LAST: the last fragment arrives (in API order) writes to color;

FIRST: the first fragment that survives the z-test writes to color;

TOP: the fragment that has the smallest (post z-test) depth value writes to color;

BOTTOM: the fragment that has the largest (post z-test) depth writes to color;

COVMAX: the last primitive that has the largest coverage mask (in terms of number of samples it covers in the pixel) writes to color;

COVMIN: the last primitive that has the smallest coverage mask writes to color;

PRIMMIN: the smallest or skinniest primitive (therefore less likely be covered or kept in neighbor) writes to color.

Among the listed strategies, SAMPLEID and LAST are directly available on existing hardware. FIRST and BOTTOM are available but require two passes of scene rasterization. The rest can be realized either in fixed-function hardware or by a software implementation with pixel-shader interlock feature. Some of these strategies aim to maximize the likelihood of getting each depth pixel a correct anchor color in its neighborhood. This is usually preferred in cases where thin geometry (either foreground or background) exists. It is understood that these strategies can be combined and employed in a checkerboard or similar pattern, e.g. odd pixels using TOP and even pixels using BOTTOM. For the case where more than one color sample are stored at each pixel, these color samples can use different strategies to maximize the likelihood that both foreground and background color are stored at each low-resolution pixel region. The pattern can also alternate the selected strategies in every frame, thus providing temporal variations to further reduce perception of pixel error.

It is understood that unlike conventional upscaling methods, the resolution of the generated depth samples are higher than the color samples and are not discarded after the image is rendered. It is also understood that the image is rendered with textures using an additional level of detail bias (LOD BIAS) of −1, added to any LOD BIAS already present.

Referring back to FIG. 4, the image rendered at the step 410 is upscaled to a third resolution, which is higher than the first resolution, at step 420. The step 420 may be performed by an upscaling engine executed by a processor, such as the upscaling engine 320 in FIG. 3. The third resolution may be as high as the second resolution, i.e., the resolution of the depth samples. In the illustrated embodiment, the rendered image is upscaled using the generated color samples and the connection information between the generated depth samples of the rendered image. The connection information may be in the form of a connectivity map. Details on how the connection information can be determined and used for upscaling are discussed in FIG. 5A to FIG. 5O.

At step 430, the upscaled image is displayed on a display device. The display device can be, for example, a smartphone or another display device having a high dots/pixels per inch, such as 300 or more dots per inch. Parameters of the upscaling, e.g., the resolutions and mapping of the generated samples, may be adjusted to meet the requirement, e.g. the native resolution, of the high-DPI display for optimal viewing. The method 400 ends at step 435.

In an alternative embodiment, the upscaled image may be anti-aliased at step 425 before the step 430. This embodiment would be ideal for a situation where the requirement, e.g., the required resolution of the final image, is less than the upscaled image, since anti-aliasing lowers the resolution of an image. The step 425 may be performed by an anti-aliasing engine executed by a processor, such as the AA engine 330 in FIG. 3

In this embodiment, the color samples of the upscaled image from the step 420 are fed directly into the anti-aliasing engine. As mentioned above, this saves the memory footprint and the bandwidth that would be spent on writing and reading the color values of the upscaled image from an intermediate color buffer. The color samples of the upscaled image is then anti-aliased to a lower resolution, such as the first resolution, to remove artifacts, e.g. remove jagged geometry edges. The upscaling step 420 and the anti-aliasing step 425 may be performed in a same pass. The anti-aliased image is then displayed on a display device at the step 430. The method 400 ends at the step 435.

In general terms, the upscaling step 420 computes color value for each depth sample at high resolution, e.g., the second resolution, based on color samples at low resolution, e.g., the first resolution, and the connection between the depth sample and its surrounding color samples. This connection can be determined by checking the consistency of depth between the color samples and the depth sample. The consistency of depth is based on a C1 (slope) continuity check of the depth values. In one embodiment, depth slopes can be computed by finite differencing of adjacent depth samples, such as the method 500 detailed below. In another embodiment, depth slopes can be computed in fragment shaders by using quad derivative intrinsic functions, and are stored alongside with color samples.

FIG. 5A illustrates a flow diagram of an embodiment of a method 500 for upscaling an image carried out according to the principles of the current disclosure. The method 500 corresponds to the step 420 in FIG. 4. The method 500 is described below with respect to 4X upscaling, which improves a resolution of an input (originally rendered) image by four (4) times. The method 500 uses the rendered image's color samples that are generated at a first resolution and the rendered image's depth samples that are generated at a second resolution. The method 500 can be performed by an upscaling engine executed by a processor, such as the upscaling engine 320 in FIG. 3. The method starts at a step 505, which is after an image has been rendered and the image's color and depth samples have been generated and stored in respective buffers.

At step 510, color samples of the rendered image are mapped to corresponding depth samples. As the second resolution is four times higher than the first resolution, there are four times more depth samples than the color samples and 4:1 (depth samples to color samples) mapping is performed. FIG. 5B illustrates this 4:1 mapping, where each color sample maps to every fourth depth sample. Looking at the grid 560 in FIG. 5B as a collection of quads, i.e. 2 samples×2 samples, each color sample maps to a depth sample in the same quadrant in each quad. Each circle denotes a color sample, each square denotes a depth sample, and each circled-square denotes a mapped color-depth pair. For clarity in FIG. 5B, only two of the circles are representatively identified as 562 and only two of the squares are representatively identified as 570.

At step 520, for each depth sample, their connection(s) with contiguous depth samples are determined. It is understood that the term "contiguous depth sample" refers to a depth sample that directly abuts a given depth sample.

To determine whether each depth sample is connected to its contiguous depth samples, the step 520 computes first slopes, i.e., dashed slopes, between each depth sample, e.g., 570-X, and the contiguous depth samples, e.g., 570-C's in FIG. 5C, and second slopes, i.e., solid slopes, between the contiguous depth samples, e.g., 570-C's, and the directionally adjacent depth samples, e.g., 570-A's. An exemplary pair of slopes is shown in FIG. 5D. It is understood that the term "directionally adjacent depth sample" refer to a depth sample that directly abuts the contiguous depth sample in a same direction as the contiguous depth sample abuts the unmapped depth sample.

The step 520 then calculates a difference between each respective first-second slope pair and compares the absolute value of the difference to a threshold. Based on this comparison, the connections between each depth sample and its contiguous depth samples are determined. This can be described as:

$$\left| \frac{z_{origin} - z_{contiguous}}{\Delta d} - \frac{z_{contiguous} - z_{directional}}{\Delta d} \right| < t, \quad (1)$$

where $z_{origin}$ corresponds to the depth value 570-X in FIG. 5D, $z_{contiguous}$ to 570-C, and $z_{directional}$ to 570-A. $\Delta d$ corresponds to the distance between the depth values, and t is the threshold value. Note that t is one of the algorithm parameters that can be modified for providing video image enhancement.

Since $\Delta d$ is positive, the equation (1) can be rewritten as $|z_{origin} - 2 z_{contiguous} + z_{directional}| < t \Delta d$ (2). It is noted that $\Delta d$ is not necessarily 1, and that it is possible for a given depth sample to be connected to the contiguous depth sample, but the contiguous depth sample not connected to the given depth sample. For depth samples located in a diagonal slope, such as 570-X, 570-Cd and 570-Δd in FIG. 5C, the threshold may be multiplied by a factor of $\sqrt{2}$ though this is not required.

In one embodiment, instead of comparing the differences of the slopes, the step 520 may use a threshold to measure how far the depth value of each depth sample is from the other depth samples in a given direction. In such an embodiment, the distance (in terms of depth value) between a given depth sample, e.g. 570-X, and a contiguous depth sample, e.g., 570-Cd and a directionally adjacent depth sample, e.g., 570-Δd is measured and compared to the threshold. For example, for a given direction, this can be described as:

$$|Z_i - 2Z_{i+1} + Z_{i+2}| < st \quad (3),$$

where Z represents a depth value, i represents a sample index along the direction, s represents a scale factor, and t represents the same threshold as in Equation (1).

If the difference (absolute value) is greater than or equal to s t, then the given depth sample is not connected to the contiguous depth sample, and if it is less than s t, then the given depth sample is connected to the contiguous depth sample via a continuous underlying surface.

Once the connections between the depth samples are determined, a flag is set for each connection. Each depth sample may have up to 8 flags. It is understood that the threshold value may be predefined, e.g. set before the method 500 starts, or set dynamically, e.g. during the method 500.

From this point, the method 500 can be broken down into three passes. For Pass 1, the method 500 computes color values for unmapped depth samples that are surrounded by diagonally contiguous color samples. For Pass 2, the method 500 computes color values for unmapped depth samples that are surrounded by horizontally/vertically contiguous color samples. For Pass 3, the method 500 assembles the computed color values for the unmapped depth samples with color values for the original color samples (originally rendered color samples) and selectively (based on their connections) sharpens/modifies them.

At step 530, for each unmapped depth sample surrounded by four diagonally contiguous color samples, e.g. 570-X, its connection(s) with those four diagonally contiguous color samples are determined using the connection information, e.g. the flags for the unmapped depth samples, from the step 520. The connections between the unmapped depth sample and the diagonally contiguous color samples may be determined by checking the flags of the unmapped depth sample with respect to the contiguous depth samples that have been mapped to respective diagonally contiguous color samples. FIG. 5E illustrates how an unmapped depth sample, e.g., 570-X, may be connected to four diagonally contiguous color samples, e.g., 562-a, 562-b, 562-c, and 562-d. In one embodiment, the connection(s) between the unmapped depth sample and the diagonally contiguous color samples may be in the form of a direction continuity mask that indicates whether a surface underlying the samples is continuous.

Once the connections between the unmapped depths samples and the diagonally contiguous color samples are determined, an interpolation method for calculating a color value for each of the unmapped depth samples is selected at step 540. In the illustrated embodiment, the interpolation method is selected based on a number of the connections between the unmapped depth sample, e.g., 570-X, and its diagonally contiguous color samples, e.g., 562-a, b, c, d, which is determined at the step 530. A number of the connections between each unmapped depth sample and its diagonally contiguous color samples can vary from zero to four.

When the number of the connections is zero or four, the unmapped depth sample is treated as an interior sample and any reasonable (even linear) image scaling algorithm may be used. One such algorithm is exemplarily illustrated in FIGS. 5F-N. The illustrated algorithm is an "offset" image scaling algorithm that for 4× scaling, i.e., 2 in each dimension, it only generates three new color values and reuses the existing fourth color. Normally, all of the pixels values are replaced with new ones in a linear algorithm.

The illustrated algorithm uses a pair of image operations, a non-linear directional interpolation D(Image, m) followed by an optional linear sharpening S(Image, s) to scale an image by a power of two in each dimension. m and s are the two parameters used by the algorithm. The illustrated algorithm's performance is typically in the gigapixel per second range and offers quality visibly superior to purely linear scaling. It is noted that the illustrated method is performed in linear color space.

FIG. 5F illustrates a grid 578 with interior unmapped depth samples 575, 576, and 577 and the color samples, i.e., shaded squares. For Pass 1, the algorithm will compute color values of unmapped depth samples that are surrounded by diagonally contiguous color samples, e.g., 575. For Pass 2, the algorithm will compute color values of unmapped depth samples surrounded by horizontally and vertically contiguous color samples, e.g., 576 and 577, by logically rotating the grid 578 45° counter-clockwise. The grid 578 that has been logically rotated for vertically contiguous color samples, e.g., 576, is shown in FIG. 5G. The grid 578 that has been logically rotated for horizontally contiguous color samples, e.g., 577, is shown in FIG. 5H. It is noted that any of the standard texture "out of range" operations, e.g., clamp, mirror, warp, border, etc., may be used to obtain data from outside the original, i.e., rendered image. A clockwise rotation can be chosen instead.

For each interior unmapped depth sample, e.g. a circled depth sample 575, two metrics, which are the sum of seven absolute differences of the luminances of the indicated diagonally-adjacent mapped color samples, are computed. The first metric, i.e., the sum of absolute differences of the luminances between seven 45° pairs of the mapped color samples 582-1, 2, 3, 4, 5, 6, 7 and their diagonally-adjacent immediate neighbors in FIG. 5I is calculated as:

$$M_{45} = \sum_{45° \text{ pairs } i,j} |lum_i - lum_j|$$

where for each 45° pair, i represents a color sample and j represents an adjacent color sample at 45° from the color sample at i. One such pair is shown in FIG. 5I as the "i sample" and "j sample." The second metric, i.e. the sum of absolute differences of the luminances between seven 135° pairs 584-1, 2, 3, 4, 5, 6, 7 in FIG. 5J is calculated as:

$$M_{135} = \sum_{135° \text{ pairs } i,j} |lum_i - lum_j|$$

where for each 135° pair, i represents a color sample and j represents an adjacent color sample at 135° from the color sample at i.

It is noted that the metric is identical to convolving the rendered image with kernels abs⊗

$$\left(\begin{bmatrix} 1 & 0 \\ 0 & -1 \end{bmatrix}\right)$$

and abs⊗

$$\left(\begin{bmatrix} 0 & 1 \\ -1 & 0 \end{bmatrix}\right)$$

and then applying an averaging filter e.g, $$\begin{vmatrix} 0 & 1 & 1 \\ 1 & 1 & 1 \\ 1 & 1 & 0 \end{vmatrix}$$

to the result. The averaging filter is an improvement over a 3×3 box filter. If the metric is "small", the image is isophotic in that direction. A small metric means that the sum of these absolute value subtractions is small, which means that each pair of values used was close to each other. "Isophotic" means "equally bright or illuminated."

The interpolation is performed in the direction that has the smallest change in brightness, e.g., not across an edge. The interpolation is performed in the direction of the dominant isophote. If no direction is dominant, a standard linear filter is used for interpolation. A dominating direction is considered by comparing relative magnitudes. Thus, given the two metrics, a graph may be classified as shown in FIG. 5K, where $F_{45}$ represents when 45° is the dominant direction, $F_{135}$ represents when 135° is the dominant direction, and $F_{4\times4}$ represents when there is no dominant direction. As such, if $M_{135} > m\, M_{45}$, $F_{45}$ interpolation along 45° is performed as shown in FIG. 5L, if $M_{45} > m\, M_{135}$, $F_{135}$ interpolation along 135° is performed as shown in FIG. 5M, and $F_{4\times4}$ interpolation is performed as shown in FIG. 5N. The parameter m is greater than or equal to 1.0, and is typically chosen to be in the range of 1.1 to 1.5. m is another algorithm parameter.

In the illustrated embodiment, $$\left[-\frac{1}{16}, \frac{9}{16}, \frac{9}{16}, -\frac{1}{16}\right]$$

are used as the weights for the $F_{45}$ and $F_{135}$ interpolations. For $F_{4\times4}$ interpolation, these same weights are used for the separable horizontal and vertical weights. It is noted that the weights are not limited to the above weights and other weights in the approximate range $$\left[-\frac{1}{8}, \frac{5}{8}, \frac{5}{8}, -\frac{1}{8}\right]$$

to $$\left[-\frac{1}{32}, \frac{17}{32}, \frac{17}{32}, -\frac{1}{32}\right]$$

may also be used.

Once directionally interpolated, the sharpen filter p'=p+s (p−blur$_{N\times N}$(p)) is applied to all channels of the pixel p that corresponds to the unmapped depth sample 575. This sharpen filter is applied only if the unmapped depth sample 575 is connected to all of its contiguous neighbors. The result is clamped to the representable range of p. In the illustrated embodiment, s is greater than or equal to 0.0, and is typically around 2.0. The blur filter is applied to a N×N neighborhood centered at p; N is odd. A blur filter $$\frac{1}{16}\begin{vmatrix} 1 & 2 & 1 \\ 2 & 4 & 2 \\ 1 & 2 & 1 \end{vmatrix}$$

is a reasonable one to use (N is 3 in that case) but any filter that qualifies as a low-pass filter may be used. s is another algorithm parameter.

In another embodiment, an interpolation method using a kernel or a Gaussian filter can be selected for an interior sample. To use an image kernel, error terms for kernels that interpolate along various directions, e.g. horizontal/0 degree, 22.5 degree, 45 degree, 67.5 degree and vertical/90 degree, are first calculated. An error term for each kernel represents a color variance in each respective direction and is calculated as a sum of the absolutes of the difference in color value along each respective direction. The kernel with the minimal error term is selected to calculate the color value of the unmapped interior depth sample. The Gaussian filter may be used when there is no dominant direction.

When the unmapped depth sample is connected to at least one, but not all, of the diagonally contiguous color samples, the unmapped depth sample is a non-interior, e.g. an edge sample, and an interpolation method using the connected diagonally contiguous color sample(s) is selected.

When the unmapped depth sample is connected to one diagonally contiguous color sample, an interpolation method using the color value of that one diagonally contiguous color samples is selected. When the unmapped sample is connected to two contiguous color samples, an interpolation method using the mean color value of those two diagonally connected color samples is selected. When the unmapped depth sample is connected to three diagonally contiguous color samples, an interpolation method using the mean value of two of the three diagonally contiguous color samples that are located on a long diagonal is selected. For example, referring back to FIG. 5E, if the unmapped depth sample 570-X is connected to three contiguous color samples 562-b, c, d, an interpolation method that uses the mean value of the color samples 562-b and c, which are on the long diagonal, is selected. Using two samples instead of three fixes a significant number of artifacts. At step 550, color values for each unmapped depth samples are calculated using the selected interpolation method of the step 540.

As the steps 530-550 are performed for unmapped diagonal depth samples such as 570-X, which are surrounded by four diagonally mapped color samples, they correspond to Pass 1. Once color values for the diagonal depth samples are determined, the steps 530-550 are repeated in Pass 2 for unmapped horizontal and vertical depth samples, which are surrounded by four diagonally/horizontally mapped color samples, e.g. 570-Ch and 570-Cv in FIG. 5C. For Pass 2, the input data would be rotated 45 degrees counterclockwise from Pass 1. As such, instead of using the connections with the diagonally contiguous color samples as in Pass 1, Pass 2 would use the connections with horizontally and vertically contiguous color samples. For example, to determine the color value of the unmapped horizontal depth sample 570-Ch located directly below 570-X, Pass 2 would use the connections with the horizontally and vertically contiguous color samples, e.g. the calculated color sample corresponding to 570-A (located directly below the aforementioned 570-Ch), 570-X, and the color samples 562-c and d. The steps 530-550 may be performed in a similar fashion when the input data is rotated 45 degrees clockwise.

Once the color values of all the unmapped depth samples are calculated, they are assembled with the color values from the original/rendered color samples and selectively modified, e.g. sharpened. It is noted that not all the color values are modified because modifying all color sample, especially those of edge samples, may create halo artifacts. As such, using the connection information from the step 520, only color values of color samples that are connected to all of their neighbors are sharpened. The step 550 corresponds to Pass 3.

The method 500 ends at step 555. The color values of unmapped depth samples determined from the method 500, which represent color values for the upscaled image, may be anti-aliased or displayed as described above with respect to FIG. 4.

The aforementioned method 500 describes the 4× upscaling. The method 500 may also be used for 2× upscaling with a slight modification. Similar to the 4× upscaling, the 2× upscaling also uses color samples that are generated at a first resolution and depth samples that are generated at a second resolution. The first resolution of the color samples would be at a half resolution of the second resolution to achieve a 2:1 mapping between the depth and color samples, whereas in the 4× upscaling, the first resolution was at a quarter resolution of the second resolution for a 4:1 mapping. To provide the color samples at a half resolution of the depth samples, the color samples are generated twice at a quarter resolution of the second resolution, first for the Original positions, i.e., locations of unshaded circles 590 in FIG. 5O, and second for the Diagonal positions, i.e., locations of shaded circles 592 in FIG. 5O. When the color and depth samples are mapped in a single grid, the grid 595 appears as a checker board as illustrated in FIG. 5O. Circles represent color samples, squares represent depth samples, and circled-squares represent mapped color and depth pairs.

It is noted that since the color values at the shaded circles 592 corresponds to the color values determined at Pass 1 of the method 500, the grid 595 in FIG. 5O can be considered as the same grid in FIG. 5B after Pass 1. As such, 2× upscaling with the 2:1 mapping may be implemented by using only Pass 2 and 3 of the method 500.

The filter map for the 2× implementation, i.e. 2:1 depth buffer to color buffer ratio, can utilize a variety of algorithms. Two example methods are described below. In an embodiment where a guided image filtering is used to sharpen the image, then the algorithm can send 49 cases (7 cases for each of the horizontal and vertical outputs) which results in a total of 6 bits per 2×2 tile. The seven cases are shown in FIG. 10, not including the case, which is not needed (since the client determines if sharpening is needed or not for each color sample.) In an embodiment where the sharpening bit is determined on the server, then 2 bits (one bit for each input color sample indicating whether to sharpen it or not) and 6 bits (8 cases stored in three bits for each output color sample) is sent for a total of 8 bits per 2×2 tile. Method 500 and FIG. 5B to 5J provide examples of the different interpolation cases that can be represented in a filter map based on connectivity information. FIG. 10 illustrates the 8 different cases for a filter map and the additional information of sharpening when determined on the server. In this embodiment, the rightmost two cases (and interpolator) indicate, respectively, that the color sample is not to be sharpened, or is to be sharpened.

FIG. 6 illustrates a flow diagram of an example method 600 for managing server system resources with respect to rendering a video. Method 600 starts at a step 601 and proceeds to a step 605 where the system will determine various user parameters for the client computing device, for example, the client video capability, including the ability to perform image corrections, the client computing device bandwidth and connectivity parameters, the client computing device display parameters, the targeted minimum FPS parameters, and the client computing device's tier level of service utilizing the user parameters. These factors can be utilized by a decision step 615.

Proceeding to a step 610, the method 600 determines a time when video rendering processes should be shifted from the server system to the client computing device. This determination can utilize factors such as the maximum number of VMs a server system can support before there is system response degradation, the type of applications running, processing demand for server system resources, such as memory, CPU cycles, GPU cycles, communication bandwidth, and other factors. Decision step 615 utilizes the data and parameters collected in steps 605 and 610 to determine when a video should be rendered on the server system or on the client computing device.

If decision step 615 resultant is a 'Yes', the method 600 proceeds to steps 630 and 650, which can be executed sequentially, overlapping, or in parallel. Step 630 pre-processes rendering data, such that the rendering data is processed through a selected compression algorithm. For example, the rendering data processing can include an algorithm to generate a color buffer, a depth buffer, and a filter or pixel connectivity map. In other embodiments, other algorithms can be applied, for example, single bit encoding for edge sensitive sharpening, compressing tile blocks, creating arrays of bitmaps, applying lossless bit-plane compressions, and other algorithms now known or later developed. The rendering data is what will be used at the client computing device to generate images to display on the client computing device. For example, the rendering data can be a color buffer and connectivity information regarding pixels of the color buffer.

In a step 632, the processed rendering data is sent to the client computing device. Proceeding to a step 634, the client video component processes the rendering data by executing a selected algorithm. Such processing of the rendering data can include decompressing the data, decoding the data, rendering the video, and upscaling the video. In a step 636, the client video component can apply various algorithms and techniques to correct the video image, such as correcting compression artifacts, applying spatial and temporal anti-aliasing, and modifying the algorithm parameters. In a step 640, the final video is sent to the client display.

In the step 650, the server system, can allocate system resources, as necessary, to achieve desired operational goals on the server system. For example, a GPU can be allocated to a different VM to maintain overall performance throughput of the running applications. In other embodiments, additional VMs can be created and supported with the resources available on the server system.

Returning to the decision step 615, if the resultant is 'No', then the method 600 proceeds to a step 620 where the rendering data is rendered on the server system. In a step 625, the video is compressed using standard techniques and is sent to the client computing device for display. In this path, the client video component un-compresses the video stream and utilizes algorithms for upscaling and correcting the video image.

Proceeding to the step 640, the client computing device displays the video. The method 600 ends at a step 660.

FIG. 7 illustrates a flow diagram of an example method 700 for the usage of various compression bit stream algorithms. In this example, method 700 is inserted between steps 630 and 632 of method 600. The method 700 begins at a step 701 which indicates that method 700 is part of another, for example, method 600. Step 630 is executed as described previously. Proceeding to a step 710, the video processor, as represented in diagram 800 as video processor 830, determines the appropriate compression bit-stream algorithm to be utilized. The determination can utilize various factors and parameters, such as the capability of the server system video processor, the resources available on the server system, the client computing device capability, and other parameters.

Method 700 describes five example algorithms, though additional algorithms can be utilized. Each of the described compression bit-stream algorithms include a type of implementation for a low resolution color buffer and higher resolution depth buffers, each of which is determined and calculated at the server system.

Path 1: Proceeding to a step 720, a connectivity bitmap can be created. This bitmap can indicate the connections between color pixels within the color buffer. The bitmap can be partitioned into 2×2 tiles of color pixels. The partitioned bitmap can then be encoded, for example, by using twelve bits with four additional bits indicating whether the pixel is an edge pixel. This can result in a representation of sixteen bits per 2×2 tile. This is a reduction from the thirty-two bits required to encode an uncompressed 2×2 tile (i.e. utilizing one bit for each filter map connection direction for each pixel in the 2×2 tile). Proceeding to a step 722, the 2×2 tiles determined in the step 720 (or a step 730, as appropriate) are collected into blocks of eight by eight (8×8) of the 2×2 tiles. If the 8×8 block does not contain an edge pixel, then the entire block can be denoted using one bit. Otherwise, the block data is used, without further compression, to denote the pixels. Proceeding to a step 724, a compression algorithm, for example, ZIP, or other compression algorithms, can be applied to the result of the step 722. The method 700 proceeds to a step 632.

Path 2: Proceeding to a step 730, the anchor, i.e. original, pixel from each 2×2 color tile can be represented by a single bit indicating whether that 2×2 tile should have a sharpening algorithm applied. The 2×2 tile can then be encoded utilizing a filter or pixel connectivity map for the remaining 3 pixels. The filter or pixel connectivity map results in twelve different values that can be encoded: one value is for applying a compression algorithm and request sharpening, one value is for applying a compression algorithm with no sharpening, four values for using one of four adjacent pixels without sharpening, and six values where two of four adjacent pixels are used without sharpening. This can reduce the required number of bits for encoding the 2×2 tile to twelve bits. The method 700 then proceeds to the step 722. In another embodiment, four of the twelve values can be removed as not affecting the visual output to a degree noticeable by a user. Therefore, only 8 values need to be encoded. This results in a total of 10 bits per 2×2 tile.

Path 3: After executing the step 730, the method 700 proceeds to a step 742. In the step 742, the 2×2 tiles determined in the step 730 are collected into blocks of 8×8 of the 2×2 tiles. Step 742 then executes recursively, i.e. a quadtree encoder is executed. Step 742 first determines one coded bit for each 8×8 block. Then the 8×8 block is split into four, four by four (4×4), blocks, each with its own coded bit. Each 4×4 block is then split into 2×2 tiles. At this point, each non-zero value can be variable length coded using an algorithm, for example, Huffman encoding. The coded bits are then combined. The method 700 then proceeds to the step 632.

Path 4: Proceeding to a step 750, since sharpening occurs for fully connected pixels, the initial encoding can be completed using arrays, i.e. bitmaps. The first array is determined by a single bit per pixel bitmap, where, for example, a bit value of zero represents a 'do not sharpen' state and a bit value of one means a 'sharpen' state. Proceeding to a step 752, a second array can be determined using values, for example, zero to ten, per pixel. The second array requires data for those corresponding bits in the first array that have a specified value, for example, zero. Proceeding to a step 754, a lossless bit plane compression technique can be applied. The resulting first and second arrays (bitmaps) can have sequences, areas, blobs, and curves containing contiguous zeros or ones. This inherent bitmap structure permits compression algorithms to perform better. The first and second arrays are then compressed, similar to the step 724. The method 700 then proceeds to the step 632.

Path 5: Proceeding to a step 760, a connectivity bitmap can be created. This bitmap can indicate the connections between color pixels within the color buffer. The bitmap can be partitioned into tiles of two by two (2×2) color pixels. The 2×2 tile can have an original pixel and three remaining pixels. Proceeding to a step 762, a color for the three remaining pixels can be determined, through using a calculated value of two color pixels or applying an interpolator algorithm.

There are additional compression bit stream algorithms that can be utilized. Not shown is an algorithm similar to that of path 4. For the second array, i.e. step 752, values 0-11 are stored for three of the depth values with one extra bit for the fourth depth value. This type of array can fit into twelve bits per 2×2 tile and can also be stored into thirteen bits, in a pattern of (4,4,4,1) which can make subsequent calculations easier and faster. The remaining steps of path 4 remain as described therein.

Also not shown is an algorithm similar to that of path 4. For the second array, i.e. step 752, values 0-7 are stored for three of the depth values. If there is only one color, then the process can use interpolation. If there are more than one color then the calculated value of two pixels is evaluated, or, in an alternative embodiment, an interpolation algorithm can be applied. A sharpening algorithm can be applied or can be skipped. An additional bit is used for the fourth depth value. This type of array can fit into ten bits for each 2×2 tile. This algorithm can also be utilized with a 2× depth ratio thereby utilizing eight bits per 2×2 tile.

Also not shown is an algorithm similar to that of path 4. For the second array, i.e. step 752, values 0-6 are stored for three of the depth values. An interpolator is applied. A sharpening algorithm can then be applied that ignores depth values, for example, an edge-sensitive sharpening algorithm, guided image filtering, or edge-threshold unsharp masking. This embodiment uses 9 bits per 2×2 tile.

In all embodiments, the bitmapping process can reduce the number of bits required to represent the filter map by increasing the threshold t, i.e. the threshold used when computing the filter or pixel connectivity map. In other words, as more pixels are identified as being connected, i.e. fewer edge pixels identified, fewer bits are needed to represent those pixel groups.

Proceeding to a step 764, an edge sensitive sharpening algorithm can be applied. Then a compression and encoding algorithm can be applied to the final result. The method 700 then proceeds to the step 632.

Proceeding to the step 632, the method 700 continues processing or executing, for example, the method 600. The method 700 ends as the method 600, or other method, continues its operations, as represented by step 790.

FIG. 8 illustrates a block diagram of an example video rendering system 800 capable of delivering a video to a client computing device. The video rendering system 800 includes a server system or set of server systems 810 and at least one client computing device 840. Server system 810 includes a processor 815, an allocator 816, a verifier 817, a virtual machine group 820, virtual machine instances 825, server system resources 827, a video processor 830, and a video pre-processor 835. Components 815, 816, 817, 820, 825, 830, and 835 represent a logical separation of functionality and these components can exist physically in various combinations, together, adjacent, or separated. In addition, these components can exist on one or more separate server systems that are communicatively coupled.

Client computing device 840 includes a video processor 842, a video renderer 844, and a client display 845. Client computing device 840 can be communicatively coupled to server system 810 by a communications connection 850. Communication connection 850 can be various available communication types, such as through the internet, wide area network, private network, a direct cable connection, such as Ethernet, and through a wireless connection.

Server system 810 can be located in one or more physical locations, for example, a data center, a cloud environment, proximate to the client computing device, and other locations. Client computing device can be located proximate to or separate from the server system 810. For example, the client computing device can be located in a user's house and the server system located in a cloud environment, or the server system and client computing device can be located proximate each other such as in a conference center.

An application or applications can be actively running in one or more of the VMs 825, of which there can be various numbers of VMs as part of 825, within the virtual machine group 820. Each of the VMs 825 require the use of some server system resources 827. For example, the resources 827 can be memory of various types, such as cache or general memory, CPU cores and cycles, GPU cores and cycles, network bandwidth, server system pipeline access, database access, permanent or magnetic based storage, such as hard drives, and other resources to support the running and operation of the VMs. The server system resources 827 can be limited as to their availability at various points in time in the operation of the VMs 825. The allocation of the server system resources 827 among the VMs 825 is the responsibility of the allocator 816. As part of allocator 816's determinations, it can, working in conjunction with processor 815, guide one or more VMs 825 to shift some video rendering tasks to the client computing device 840 thereby increasing the availability of server system resources 827 to the VMs 825 and allowing the potential creation of additional VMs 825.

Processor 815, which can be one or more processors located together or separately, provides for the control of the virtual machine group 820 and executes the methods described herein. As an application executes and a video is to be displayed for a user of the client computing device 840, the processor 815 determines, utilizing resource allocator 816, computational load, client computing system 840 capability, user tier level of service, and other factors, where the rendering data should be rendered to provide the desired FPS throughput for the user while not over allocating the server system resources 827.

In an alternative, video processor 830 can utilize pre-processor 835 to pre-process the rendering data by applying compression bit-stream algorithms and techniques to deliver a compressed rendering data to client computing device 840. Video processor 842, working with renderer 844, can decode, decompress, upscale, apply image corrections due to compression artifacts, to the rendering data, and otherwise prepare the video for display on the display 845. This alternative path shifts a portion of the video rendering to the client computing device 840 from the server system 810.

Verifier 817 is a logical process that allows the application VM to request information from the client computing system 840 to identify parameters to be used by the processor 815 and video processor 830. For example, verifier 817 can determine the available bandwidth provided by communication connection 850, can determine the display 845 resolution, and can determine the capabilities and protocols supported by video processor 842. These parameters can be used to select an appropriate compression algorithm and to determine the parameters to be utilized with the selected compression algorithm.

FIG. 9 illustrates a block diagram of an example compression algorithm system flow 900. Flow 900 builds on the system rendering system 800. Video processor 830 can execute various algorithms and one such algorithm is demonstrated in flow 900. A low resolution color buffer 910 can be determined and then passed to a video encoder 912. A high resolution depth buffer 915 can be determined and then the depth buffer can be partitioned to create a filter map 917. The result can then be passed to a lossless encoder.

The output from the lossy video encoder 912 and lossless encoder 919 can be passed, through communications connection 850, to computing device 840 and more specifically to video processor 842.

Video encoder 912's output can be passed to video decoder 930, which in turn passes its output to the lossy low resolution color buffer 932. Lossless encoder 919's output can be passed to the filter map decoder 935, which in turn passes its output to the filter map 937. Buffer 932 and map 937 each pass their respective outputs to renderer 844 which can execute the rendering algorithm 940. The output of algorithm 940 generates a high resolution color buffer 942. Buffer 942's output is then further processed by video processor 842 and prepared for display on display 845 (shown by the unconnected arrow).

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

The above-described apparatuses, systems or methods or at least a portion thereof may be embodied in or performed by various processors, such as digital data processors or computers, wherein the processors are programmed or store executable programs or sequences of software instructions to perform one or more of the steps of the methods or functions of the apparatuses or systems. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system described herein.

Certain embodiments disclosed herein or features thereof may further relate to computer storage products with a non-transitory computer-readable medium that has program code thereon for performing various computer-implemented operations that embody at least part of the apparatuses, the systems, or to carry out or direct at least some of the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

What is claimed is:

1. A method of upscaling an image, comprising:
rendering an image, wherein said rendering includes generating color samples of said image at a first resolution and depth samples of said image at a second resolution, which is higher than said first resolution; and
upscaling said image to an upscaled image at a third resolution, which is higher than said first resolution, using said color samples and said depth samples, wherein said upscaling includes computing connections between said depth samples by determining first slopes between said depth samples and contiguous depth samples and determining second slopes between said contiguous depth samples and directionally adjacent depth samples.

2. The method of claim 1 further comprising:
displaying said upscaled image at a native resolution of a display device, wherein said third resolution is said native resolution of said display device.

3. The method of claim 1, wherein said third resolution is said second resolution.

4. The method of claim 1, wherein said upscaling further includes:
mapping said color samples to said depth samples;
determining color values for unmapped depth samples of said depth samples based on said mapping and said connections; and
assembling color values for mapped depth samples of said depth samples with said color values for said unmapped depth samples.

5. The method of claim 4, wherein computing said connections between said depth samples includes:
calculating differences between said first slopes and said second slopes; and
comparing absolute values of said differences to a scaled threshold value.

6. The method of claim 4, wherein when said unmapped depth samples are interior depth samples, said determining said color values includes:
calculating error terms for multiple kernels that interpolate along multiple directions;
selecting one of said multiple kernels that has a minimum error term; and
convolving said one kernel along a respective direction.

7. The method of claim 1, wherein said generating said color samples includes generating said color samples twice at said first resolution.

8. The method of claim 1, wherein said generating said color samples includes:
selecting a fragment that affects a color value of one of said color samples based on at least one of attributes of said fragment; and
writing to said color value of said one color sample using said fragment.

9. The method of claim 8, wherein said attributes include a pre-specified sample ID of said fragment, an API order of said fragment, a depth value of said fragment, a coverage mask of said fragment, and a size of said fragment.

10. The method of claim 1, further comprising anti-aliasing said upscaled image, and wherein said anti-aliasing is carried out in a single pass with said upscaling.

11. The method of claim 10, wherein said anti-aliasing includes:
dividing color samples of said upscaled image into groups; and
determining an average color value for each of said groups.

12. The method of claim 10, wherein said anti-aliasing includes obtaining an anti-aliased image by applying an anti-aliasing filter to color samples of said upscaled image, wherein said anti-aliased image is at a resolution lower than said third resolution.

13. The method of claim 1, wherein said color samples and said depth samples correspond to one another via locations of said color samples and said depth samples in a grid.

14. A system for upscaling an image, comprising:
a processor that includes:
  a rendering engine configured to render an image by generating color samples of said image at a first resolution and depth samples of said image at a second resolution, which is higher than said first resolution; and
  an upscaling engine configured to upscale said image to an upscaled image at a third resolution, which is higher than said first resolution, using said color samples and said depth samples, wherein said using includes computing connections between said depth samples by determining first slopes between said depth samples and contiguous depth samples and determining second slopes between said contiguous depth samples and directionally adjacent depth samples; and
a memory coupled to said processor and that includes a color buffer storing said color samples and a depth buffer storing said depth samples.

15. The system of claim 14 further comprising a display device configured to display said upscaled image at a native resolution of said display device, wherein said third resolution is said native resolution of said display device.

16. The system of claim 14, wherein said third resolution is said second resolution.

17. The system of claim 14, wherein said using further includes:
  mapping said color samples to said depth samples;
  determining color values for unmapped depth samples of said depth samples based on said mapping and said connections; and
  assembling color values for mapped depth samples of said depth samples with said color values for said unmapped depth samples.

18. The system of claim 17, wherein said connections between said depth samples are computed by:
  calculating differences between said first slopes and said second slopes; and
  comparing absolute values of said differences to a scaled threshold value.

19. The system of claim 17, wherein when said unmapped depth samples are interior depth samples, said color values is determined by:
  calculating error terms for multiple kernels that interpolate along multiple directions;
  selecting one of said multiple kernels that has a minimum error term; and
  convolving said one kernel along a respective direction.

20. The system of claim 14, wherein said color samples are generated twice at said first resolution.

21. The system of claim 14, wherein said color samples are generated by selecting a fragment that affects a color value of one of said color samples based on at least one of attributes of said fragment and writing to said color value of said one color sample using said fragment.

22. The system of claim 21, wherein said attributes include a pre-specified sample ID of said fragment, an API order of said fragment, a depth value of said fragment, a coverage mask of said fragment, and a size of said fragment.

23. The system of claim 14, wherein said processor further comprises an anti-aliasing engine that is configured to divide color samples of said upscaled image into groups and determine an average color value for each of said groups.

24. The system of claim 23, wherein said anti-aliasing engine is further configured to apply an anti-aliasing filter to color samples of said upscaled image to obtain an anti-aliased image, wherein said anti-aliased image is at a resolution lower than said third resolution.

25. The system of claim 14 wherein said color samples and said depth samples correspond to one another via locations of said color samples and said depth samples in a grid.

26. A non-transitory computer-readable medium storing executable instructions that, when executed by one or more processors, cause said one or more processors to:
  render an image by generating color samples of said image at a first resolution and depth samples of said image at a second resolution, which is higher than said first resolution; and
  upscale said image to an upscaled image at said second resolution using said color samples and said depth samples, wherein said using includes computing connections between said depth samples by determining first slopes between said depth samples and contiguous depth samples and determining second slopes between said contiguous depth samples and directionally adjacent depth samples.

* * * * *